(12) United States Patent
Ishimaru et al.

(10) Patent No.: US 6,416,262 B1
(45) Date of Patent: Jul. 9, 2002

(54) GEAR SHAPING METHOD AND DEVICE AND SPIRAL BEVEL GEAR CUTTER

(75) Inventors: Toshiaki Ishimaru; Youzou Nakamura; Akihide Kakutani; Tsuneo Egawa, all of Shiga (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/424,923

(22) PCT Filed: Mar. 29, 1999

(86) PCT No.: PCT/JP99/01580

§ 371 (c)(1),
(2), (4) Date: Dec. 1, 1999

(87) PCT Pub. No.: WO99/50016

PCT Pub. Date: Oct. 7, 1999

(30) Foreign Application Priority Data

Apr. 1, 1998 (JP) .............................. 10-88555
Aug. 7, 1998 (JP) ........................... 10-224232

(51) Int. Cl.[7] .............................. B23F 17/00; B23F 7/04
(52) U.S. Cl. ............................... 409/1; 407/20; 409/12; 409/26; 409/27; 409/51; 428/698
(58) Field of Search ............................... 409/26, 12, 11, 409/137, 27, 51, 50, 13, 1; 428/627, 698; 407/20, 21, 23, 26, 28, 29; 134/30; 451/148

(56) References Cited

U.S. PATENT DOCUMENTS

| | | | |
|---|---|---|---|
| 4,534,803 A | * 8/1985 | Asano et al. | .................. 134/30 |
| 4,645,715 A | 2/1987 | Ovshinsky et al. | |
| 5,105,697 A | 4/1992 | Gruber | |
| 5,549,975 A | * 8/1996 | Schulz et al. | ............... 428/553 |
| 5,580,653 A | 12/1996 | Tanaka et al. | |
| 5,586,848 A | * 12/1996 | Suwijn | ....................... 409/137 |
| 5,656,383 A | * 8/1997 | Tanaka et al. | .............. 428/627 |
| 5,662,514 A | 9/1997 | Masseth et al. | |
| 6,065,910 A | * 5/2000 | Egawa et al. | .................. 409/26 |

FOREIGN PATENT DOCUMENTS

| | | |
|---|---|---|
| DE | 19517120 | 11/1995 |
| JP | 60-14818 U | 1/1985 |

(List continued on next page.)

OTHER PUBLICATIONS

Stadtfeld, H. J.: "Dry Cutting of Bevel and Hypoid Gears"; Gear Technology, US, Randall Publishing Co., Elk Grove, Illinois; vol. 15, No. 3, May 1, 1998, pp. 40–43.

F. Klocke: "Dry Hobbing—Efficient and Ecological"; VDI Berichte, Duesseldorf, DE, No. 1230, 1996, pp. 509–523.

Kase, Shin; Practical Machining Textbook, Daily Industrial Newspaper Co., Ltd., p. 145, lines 2 and 16.

Machining Technique Handbook, Revised and Enlarged Edition, edited by Machining Technique Handbook Editor's Committee: Daily Industrial Newspaper Co., Ltd.., p. 431, lines 4–8 and p. 432, lines 8–11.

Newspaper articles regarding winning of Minister of International Trade and Industry Award for Superior Energy–Saving Device, Feb. 5, 1999.

(List continued on next page.)

*Primary Examiner*—William Briggs

(57) ABSTRACT

A bevel gear is generated using an annular milling cutter having a blade material made of a high-speed tool steel mounted to a main body, the blade material being coated with at least one layer of a film of a composition substantially comprising $(Ti_{(1-x)}Al_x)(N_yC_{(1-y)})$ (where, $0.2 \leq x \leq 0.85$, $0.2 \leq y \leq 1.0$), and dry cutting is performed at a cutting speed in the range from 20 to 400m/min without using a cutting oil. With this method, teeth can be generated at a greatly improved cutting speed without using any expensive tool such as cemented carbide, thereby realizing efficient production of a bevel gear at a reduced cost.

19 Claims, 22 Drawing Sheets

FOREIGN PATENT DOCUMENTS

| | | | |
|---|---|---|---|
| JP | 64-71643 | A | 3/1989 |
| JP | 3-17251 | A | 1/1991 |
| JP | 453642 | B2 | 8/1992 |
| JP | 4221057 | A | 8/1992 |
| JP | 567705 | B2 | 9/1993 |
| JP | 407018416 | * | 1/1995 |
| JP | 8-3750 | A | 1/1996 |
| JP | 8-199340 | A | 8/1996 |
| JP | 9104966 | A | 4/1997 |
| JP | 264710 | B2 | 5/1997 |

OTHER PUBLICATIONS

Newspaper article regarding winning of Nikkei Award for Excellent Product, Feb. 18, 1999.

Kitaura, Sei–Ichiro and Torii, Nobuyoshi; Practice in Cutting of a Hard Material, Dec. 1994, p. 21.

Kusakabe, Yuji, Mizuta, Mitsuo, and Arai, Kunihiko; Cutting Performance of (Ti,Al)N Coated Gear Hobs, Kobe Steel Engineering Reports, vol. 41, No. 3 (1991), p. 43.

Yamada, Yasuyuki, Aoki, Taiitu, Tanaka, Yusuki, Hayasaki, Hiroshi and Motonishi, Suguru; High Speed Cutting Performance of (Al,Ti)N Coated Carbide Endmills, pp. 211–216.

Gear Technology, Nov./Dec. 1994.

Werner, Proceeding of Schmalkalde Tool Meeting, vol. 2—"Current Status of Dry Cutting by Use of Powder Metallurgical High–Speed Steel and Cemented Carbide Tools" (partial translation provided).

Faulstich, Ingo, German Industrial Forum for Technology, Oct. 19 and 20, 1995, "Dry Machining of Cylindrical Gearwheels by Hobbing" (partial translation provided of Sections 2, 2.1, and 2.1.1.

Kono, Kenyu, Machine Technology, Sep. 1996, vol. 44, No. 9, pp. 44–47—"Effective Use of Gear–Cutting Tools 1" (partial translation provided for marked sections on pp. 45–46.

"Werkstatt und Betrieb," Trocken wälzfräsen mit Hartmetall, 128 (1955) 9 (Germany), p. 789–792 (partial translation provided for marked sections on pp. 789–790).

* cited by examiner

GEAR SHAPING METHOD AND DEVICE AND SPIRAL BEVEL GEAR CUTTER

This application is the national phase under 35 U.S.C. §371 of PCT International Application No. PCT/JP99/01580 which has an International filing date of Mar. 29, 1999, which designated the United States of America.

TECHNICAL FIELD

This invention relates to a gear cutting method and a gear cutting apparatus for generating a bevel gear using a spiral bevel gear cutter having mounted thereon a blade material made of a high-speed tool steel.

BACKGROUND TECHNOLOGY

When generating a bevel gear such as a spiral bevel gear or a hypoid gear using a spiral bevel gear cutter, a spiral gear cutting machine is used. An outline of a spiral bevel gear cutting machine will be described with reference to FIG. 21. FIG. 21 illustrates a brief construction of a spiral bevel gear cutting machine.

In a spiral bevel gear cutting machine 1, an annular milling cutter 2 as a spiral bevel gear cutter is mounted on a main shaft 4 of a cutter head 3, and a work 5 is attached to a work shaft 6 side. Rotational center axes of the main shaft 4 and the work shaft 6 are disposed to be crossing when viewed on a plane. The cutter head 3 is supported to be revolvable round the mechanical center axis, and the main shaft 4 is rotatably supported on the cutter head 3. The work shaft 6 rotates in cooperation with rotation of the main shaft 4 and revolution of the cutter head 3. In FIG. 21, numeral 7 indicates a nozzle for supplying a cutting oil 8.

The annular milling cutter 2, as shown in FIG. 22, comprises a plurality of blade materials 10 made of a high-speed steel mounted in a ring form on the outer periphery of a disk-formed main body 9.

When generating teeth on the work 5 using the spiral bevel gear cutting machine 1, the work 5 is mounted to the work shaft 6 side, and the annular milling cutter 2 is mounted to the main shaft 4 side. The cutter head 3 is revolved and the main shaft 4 is driven rotatively to revolve and rotate the annular milling cutter 2, and the work shaft 6 is rotated to rotate the work 5. The annular milling cutter 2 revolves round the mechanical center while rotating together with a virtual crown gear so that a tooth surface of the virtual crown gear is depicted by a cutting edge of the annular milling cutter 2. The work 5 is rotated to mesh with the tooth surface so that the tooth surface is generated on the work 5. During the gear cutting work, the cutting oil 8 is fed from the nozzle 7 to the cutting portion to lubricate and cool the cutting portion.

In order to reduce the machining cost in teeth generation by the annular milling cutter 2, it is necessary to rotate the annular milling cutter 2 at a higher speed so that the machining be carried out in a short time. In the present situation, however, the peripheral speed (cutting speed) of the annular milling cutter 2 is limited due to the wear of the cutter, and thus there has been a limitation in reduction of the machining time. This is presently an obstacle to the reduction of the machining cost.

Recently, a high-speed machining technique using an annular milling cutter 2 applied with the blade material 10 made of a cemented carbide has been developed, and thus generation of teeth by the spiral bevel gear cutting machine 1 has become more efficient. In the case of using the annular milling cutter 2 applied with the blade material made of cemented carbide, a heat crack will develop if machining is performed under the supply of cutting oil, because cemented carbide is fragile. For this reason, in the case of using the annular milling cutter 2 applied with the blade material 10 made of cemented carbide, use of a dry cutting method becomes a mainstream in which machining is performed without the supply of cutting oil. Since cemented carbide is much higher in both heat resistance and wear resistance than the high-speed steel, no problem occurs even if such a dry cutting is performed.

As mentioned above, the machining efficiency is improved by using the annular milling cutter 2 applied with the blade material 10 made of cemented carbide and it may become possible to reduce the machining cost by the improved machining efficiency. However, the blade material 10 made of cemented carbide is so expensive that the total cost becomes extremely high even if the machining efficiency is improved. In addition, since cemented carbide is fragile, there is a fear that a sudden crack may occur. For this reason, the blade material 10 made of cemented carbide is not presently in wide practical use.

The present invention has been accomplished in view of the above-mentioned circumstances and it is an object of the present invention to provide a gear cutting method and a gear cutting apparatus capable of considerably improving the cutting speed without using a blade material made of cemented carbide for the spiral bevel gear cutter. Another object of the present invention is to provide a spiral bevel gear cutter capable of greatly improving the cutting speed without using a blade material of cemented carbide.

DISCLOSURE OF THE INVENTION

In accordance with the present invention which attains the above objects, there is provided a gear cutting method for a bevel gear using a spiral bevel gear cutter having a blade material made of a high-speed tool steel mounted on a cutter main body and coated with at least one layer of a film of a composition substantially comprising TiAlN, by which teeth are generated by dry cutting without using a cutting oil at a cutting speed in a range from 20 to 400 m/min.

According to the present gear cutting method, teeth of a bevel gear can be generated at a greatly improved cutting speed without using any expensive blade material such as a tool made of cemented carbide or the like.

Further, the gear cutting method according to the present invention which attains the above objects generates teeth of a bevel gear using a spiral bevel gear cutter having a blade material made of a high-speed tool steel mounted on a cutter main body, the blade material being coated with at least one layer of a film of a composition substantially comprising:

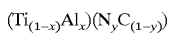

Where, $0.2 \leq x \leq 0.85$,
$0.2 \leq y \leq 1.0$,
the cutting speed being in a range from 20 to 400 m/min, and teeth are generated by dry cutting without using a cutting oil.

With the present method, teeth of a bevel gear can be generated at a greatly improved cutting speed without using any expensive blade material such as a tool made of cemented carbide or the like.

Still further, the gear cutting method which attains the above objects is characterized in that teeth of a bevel gear are generated using a spiral bevel gear cutter having a blade material made of a high-speed tool steel mounted on a cutter main body, the blade material being coated with at least one layer of a film of a composition substantially comprising:

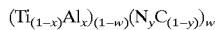

where, $0.2 \leq x \leq 0.85$,
$0.2 - y \leq 1.0$
$0.45 \leq w \leq 0.55$,
the cutting speed being in a range from 20 to 400 m/min, and teeth are generated by dry cutting without using a cutting oil.

With the present method, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

Yet further, according to the present invention which attains the above objects, there is provided a gear cutting method characterized in that teeth of a bevel gear are generated using a spiral bevel gear cutter having a blade material made of a high-speed tool steel mounted on a cutter main body, where a nitride forming element is represented by M, the blade material being coated with at least one layer of a film of a composition substantially comprising:

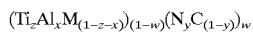

where, $0.2 \leq x \leq 0.85$,
$0.2 \leq y \leq 1.0$
$0.15 \leq z \leq 0.8$
$0.7 \leq (z+x) < 1.0$
$0.45 \leq w \leq 0.55$.
the cutting speed being in a range from 20 to 400 m/min, and teeth are generated by dry cutting without using a cutting oil.

With the present method, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

Yet further, the gear cutting method of the present invention is characterized in that the cutting speed is in a range from 40 to 120 m/min.

Yet further, the gear cutting method according to the present invention is characterized in that teeth are generated while blowing air against the cutting portion to remove cutting debris. Yet further, during the gear cutting work, teeth are generated while blowing air against the cutting portion in a direction along the rotational direction of the spiral bevel gear cutter to blow off cutting debris, and from the outer periphery towards the center of the spiral bevel gear cutter to blow off cutting debris from a space between the blade materials, and cooling air is blown against the work. This prevents cutting debris from biting into the work.

Yet further, the generated gear is a bevel gear used for an automotive reduction apparatus.

A gear cutting apparatus of the present invention which attains the above objects for generating a bevel gear is characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon and coated with at least one layer of a film of a composition substantially comprising TiAlN, teeth are generated by dry cutting without using a cutting oil at a cutting speed in a range from 20 to 400 m/min.

With the present apparatus, teeth of a bevel gear can be generated at a greatly improved cutting speed without using any expensive blade material such as a tool made of cemented carbide or the like.

Still further, according to the present invention which attains the above objects, there is provided a gear cutting apparatus for generating a bevel gear characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon and coated with at least one layer of a film of a composition substantially comprising:

where, $0.2 \leq x \leq 0.85$,
$0.2 \leq y \leq 1.0$,
the cutting speed being in a range from 20 to 400 m/min, and teeth are generated by dry cutting without using a cutting oil.

With the present apparatus, teeth of a bevel gear can be generated at a greatly improved cutting speed without using any expensive blade material such as a tool made of cemented carbide or the like.

Yet further, according to the present invention which attains the above objects, there is provided a gear cutting apparatus for generating a bevel gear characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon and coated with at least one layer of a film of a composition substantially comprising:

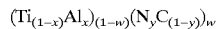

where, $0.2 \leq x \leq 0.85$,
$0.2 \leq y \leq 1.0$
$0.45 \leq w \leq 0.55$,
the cutting speed being in a range from 20 to 400 m/min, and teeth are generated by dry cutting without using a cutting oil.

With the apparatus according to the present invention, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

Yet further, according to the present invention which attains the above objects, there is provided a gear cutting apparatus for generating a bevel gear characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon, where a nitride forming element is represented by M, and coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$
$0.15 \leq z \leq 0.8$
$0.7 \leq (z+x) \leq 1.0$
$0.45 \leq w \leq 0.55$;

the cutting speed being in a range from 20 to 400 m/min, and teeth are generated by dry cutting without using a cutting oil.

With the apparatus according to the present invention, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

Yet further, the gear cutting apparatus of the present invention is characterized in that the cutting speed is in a range from 40 to 120 m/min.

Yet further, the gear cutting apparatus of the present invention is characterized by air supply means provided for blowing air to blow off cutting debris against the cutting portion. Yet further, a first air nozzle is provided for blowing air to blow off cutting debris against the cutting portion in a direction along the rotational direction of the spiral bevel cutter, and a second air nozzle is provided for blowing air to blow off cutting debris from a space between the blade materials, and cooling air is blown against the work. and a third air nozzle is provided for blowing work cooling air.

This prevents cutting debris from biting into the work.

A spiral bevel gear cutter according to the present invention which attains the above objects is characterized by a blade made of a high-speed tool steel mounted on a cutter main body and coated with at least one layer of a film of a composition substantially comprising TiAlN, teeth are generated by dry cutting without using a cutting oil at a cutting speed in a range from 20 to 400 m/min.

With the present invention, teeth of a bevel gear can be generated at a greatly improved cutting speed without using any expensive blade material such as a tool made of cemented carbide or the like.

Further, a spiral bevel gear cutter which attains the above objects is characterized by a blade made of a high-speed tool steel mounted on a cutter main body and coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$, the cutting speed being in a range from 20 to 400 m/min, and teeth are generated by dry cutting without using a cutting oil.

With the present invention, teeth of a bevel gear can be generated at a greatly improved cutting speed without using any expensive blade material such as a tool made of cemented carbide or the like.

Still further, a spiral bevel gear cutter which attains the above objects is characterized by a blade made of a high-speed tool steel mounted on a cutter main body and coated with at least one layer of a film of a composition substantially comprising:

$$(Ti_{(1-x)}Al_x)_{(1-w)}(N_yC_{(1-y)})_w$$

where, $0.2 \leq x \leq 0.85$,
$0.2 \leq y \leq 1.0$
$0.45 \leq w \leq 0.55$, the cutting speed being in a range from 20 to 400 m/min, and teeth are generated by dry cutting without using a cutting oil.

With the present invention, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

Yet further, a spiral bevel gear cutter which attains the above objects is characterized by a blade made of a high-speed tool steel mounted on a cutter main body, where a nitride forming element is represented by M, and coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$
$0.15 \leq z \leq 0.8$
$0.7 \leq (z+x) \leq 1.0$
$0.45 \leq w \leq 0.55$, the cutting speed being in a range from 20 to 400 m/min, and teeth are generated by dry cutting without using a cutting oil.

According to the present invention, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable.

The cutting speed is in a range from 40 to 120 m/min.

Yet further, teeth are generated while blowing air to blow off cutting debris against the cutting portion. Yet further, during the gear cutting work, teeth are generated while blowing air against the cutting portion in a direction along the rotational direction of the spiral bevel gear cutter to blow off cutting debris, and from the outer periphery towards the center of the spiral bevel gear cutter to blow off cutting debris from a space between the blade materials, and cooling air is blown against the work.

This prevents cutting debris from biting into the work.

Yet further, the generated gear is a bevel gear used for an automotive reduction apparatus.

BRIEF DESCRIPTION OF THE DRAWINGS

FIG. 4 is a front diagram of a hob;

BEST MODE FOR PRACTICING THE INVENTION

Preferred embodiments of the present invention will be described below with reference to the drawings.

However, material types, shapes, relative positions thereof and the like of components disposed in the embodiments are given by way of illustration only, and thus are not intended to be limitative of the present invention unless otherwise specified.

Figure 1:
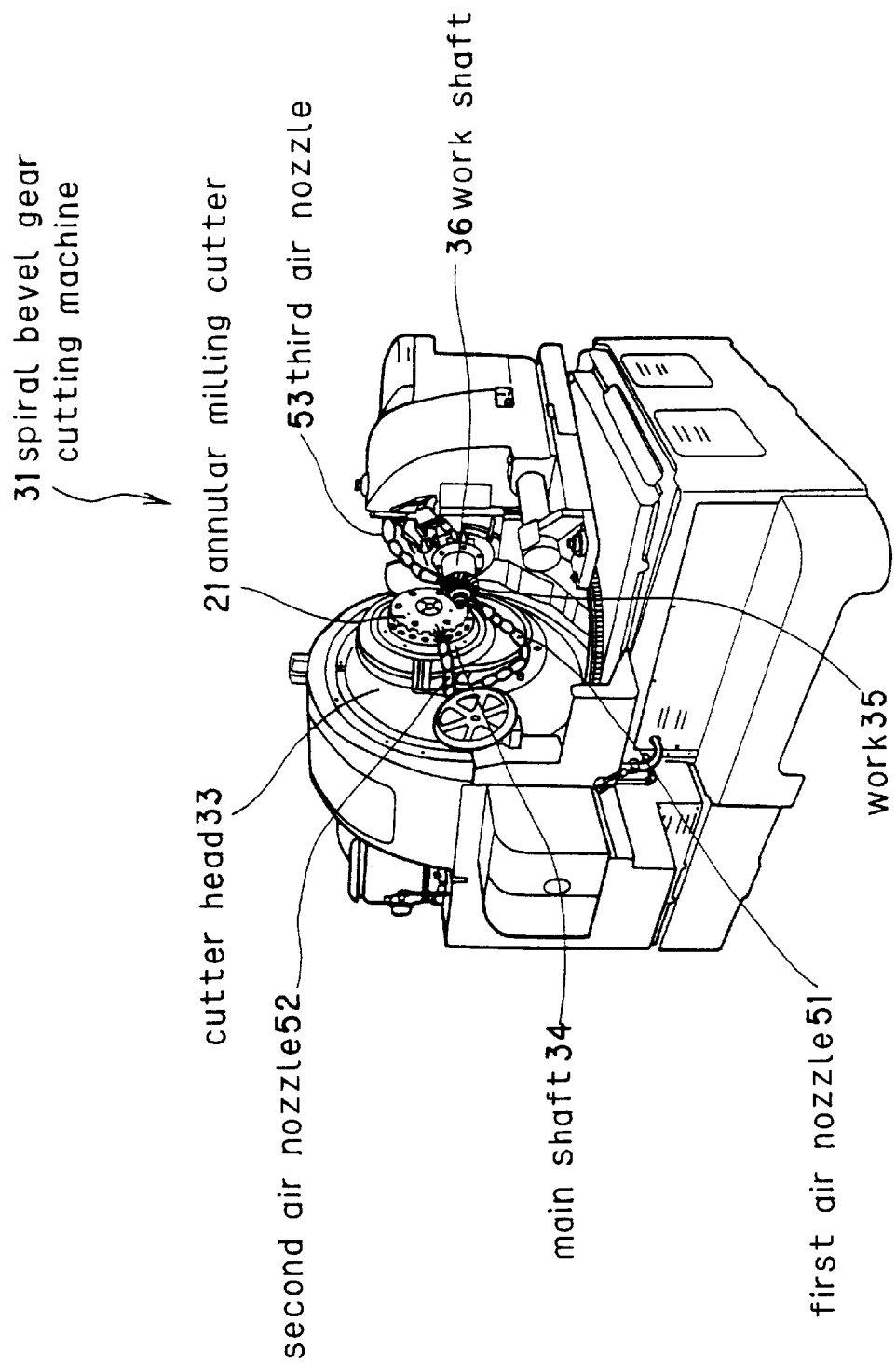
FIG. 1 is a schematic construction diagram of a gear cutting apparatus according to an embodiment of the present invention.
Figure 2:
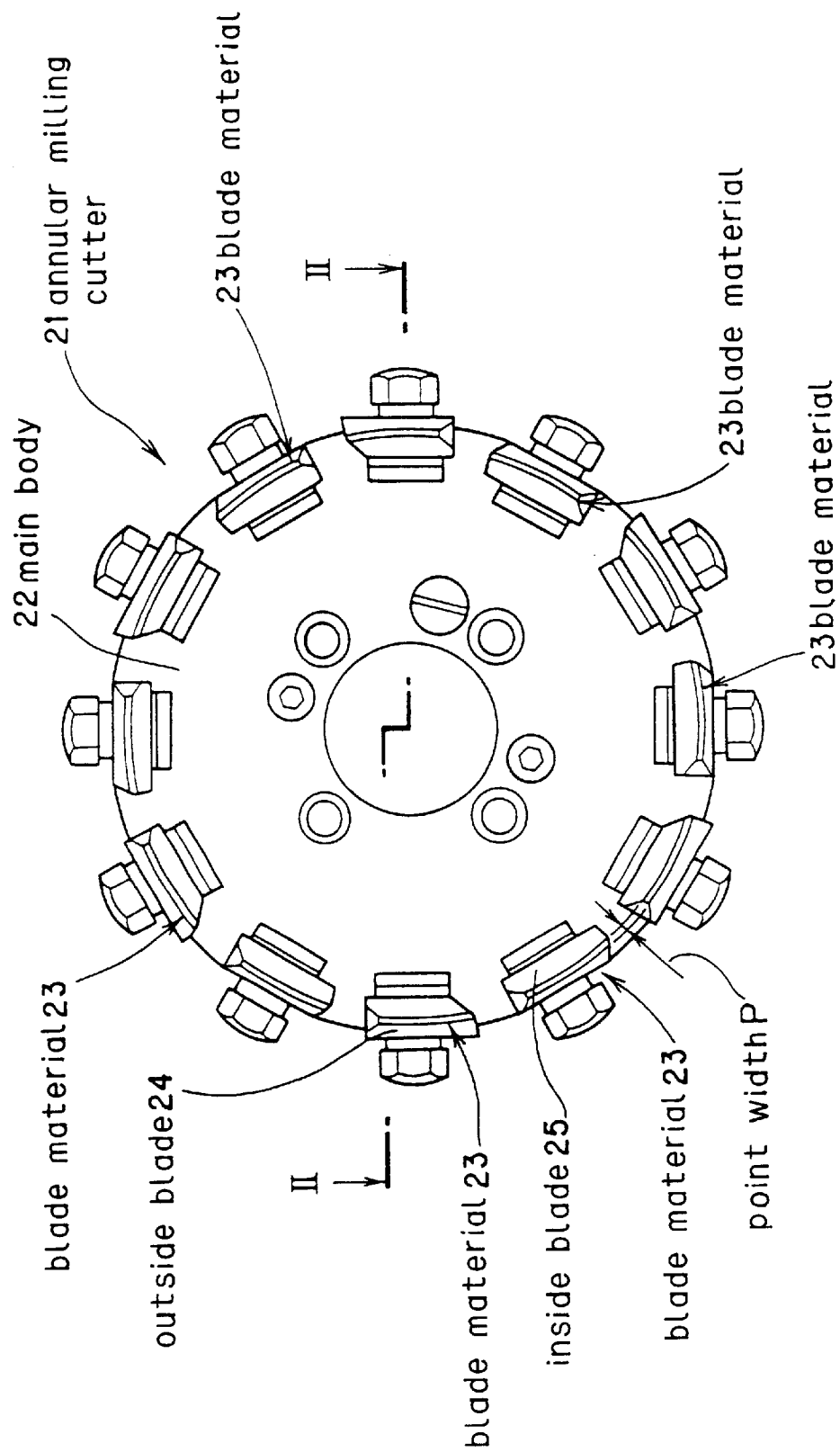
FIG. 2 is a plane diagram showing an annular milling cutter for carrying out the gear cutting method of the present invention.
Figure 3:
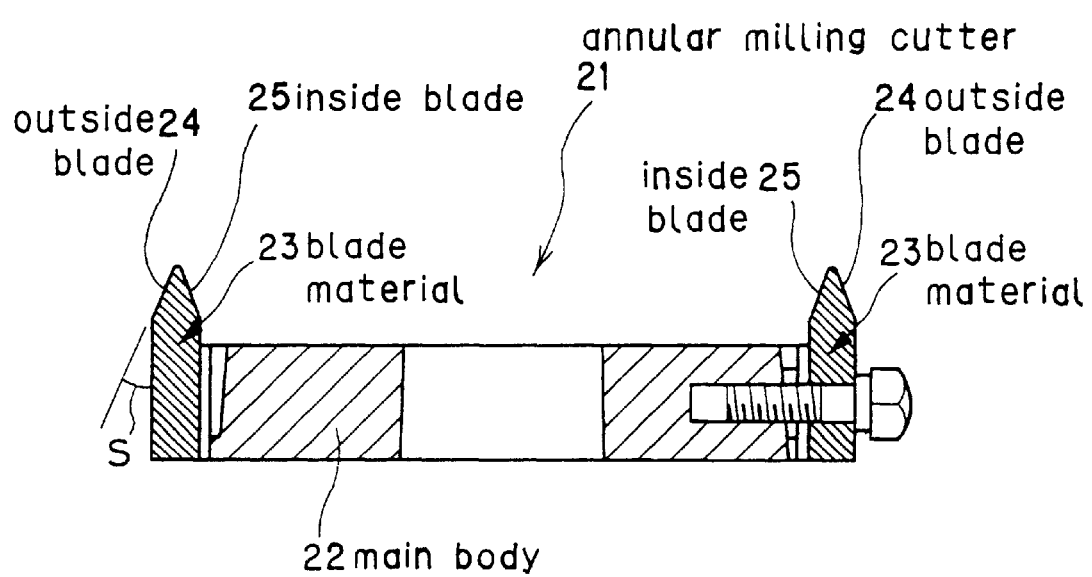
FIG. 3 is a schematic sectional diagram taken along line II—II in FIG. 2.

The construction of a spiral bevel gear cutting machine as a gear cutting apparatus for carrying out the gear cutting method of the present invention and the construction of an annular milling cutter as a spiral bevel gear cutter will be described with reference to FIGS. 1 to 3. FIG. 1 schematically illustrates the spiral bevel gear cutting machine, FIG. 2 is a plane illustration of an annular milling cutter, and FIG. 3 is a sectional diagram taken along line II—II in FIG. 2.

As shown in FIG. 1, in a spiral bevel gear cutting machine 31, an annular milling cutter 21 as a spiral bevel gear cutter is mounted to a main shaft 34 side of a cutter head 33, and a work 35 is mounted to a work shaft 36 side. Rotational axes of the main shaft 34 and the work shaft 36 are disposed to intersect when viewed on a plane. The cutter head 33 is supported to be revolvable round a mechanical center, and the main shaft 34 is rotatably supported on the cutter head 33. The work shaft 36 rotates in cooperation with rotation of the main shaft 34 and revolution of the cutter head 33. Since the gear cutting method according to the present invention generates teeth by dry cutting, any nozzle for supplying a cutting oil is not provided.

At the cutter head 33 side, a first air nozzle 51 as air supply means is provided for blowing air towards the cutting portion of the annular milling cutter 21, and at the cutter head 33 side, a second air nozzle 52 is provided for blowing air towards the annular milling cutter. Further, at a work head 55 side, a third air nozzle 53 is provided for blowing air towards other than the cutting portion of the work 35.

When teeth are generated on the work 35 using the spiral bevel gear cutting machine 31, the work 35 is mounted to the work shaft 36 side, and the annular milling cutter 21 to the main shaft 34 side. The cutter head 33 is revolved and the main shaft 34 is driven rotatively to revolve and rotate the annular milling cutter 21, and the work shaft 36 is rotated to rotate the work 35. The annular milling cutter 21 while rotating revolves about the mechanical center along with the virtual crown gear so that the tooth surface of the virtual crown gear is depicted by a cutting edge of the annular milling cutter 2. The work 35 is rotated to mesh with the tooth surface so that the tooth surface is generated on the work 5.

The tooth-generated work 35 by the annular milling cutter 21 using the spiral bevel gear cutting machine 31 can be used, for example, as an automotive reduction gear.

As shown in FIGS. 2 and 3, the annular milling cutter 21 as a spiral bevel gear cutter is provided with a plurality of blade materials 23 mounted in a ring form on the outer periphery of the disk-formed main body 22. The blade material 23 has an outside blade 24 and an inside blade 25, with a point width P of 0.06 inch between the outside blade 24 and the inside blade 25, a pressure angle S of 10 to 20 degrees, and directed in the right direction.

When teeth are generated on the work using the spiral bevel gear cutting machine 31, the annular milling cutter 21 fixed thereon with the blade materials is while rotating revolved about the mechanical center along with the virtual crown gear so that the tooth surface of the virtual crown gear is depicted by the cutting edge of the annular milling cutter 21, and the work is rotated to mesh with the tooth surface so that the tooth surface is generated on the work, thus performing gear cutting of the spiral bevel gear. A hypoid gear is similarly machined to generate the tooth surface. During the gear cutting work, cutting is performed without the supply of a cutting oil (dry cutting). In dry cutting, since cutting oil is not used, there is no staining on the floor nor generation of malodor, and treatment of waste oil becomes needless. Therefore, dry cutting is suitable for improving working environment as well as global environment.

In the dry cutting, gear cutting is performed while blowing air from the first air nozzle 51 and the second air nozzle 52. From the first air nozzle 51, air is blown against the cutting portion of the work 35, and cutting debris generated in association with cutting is blown off from the cutting portion. From the second air nozzle 52, air is blown towards the center from the outer peripheral direction of the annular milling cutter 21 against a gap of the blade materials 23 to blow off cutting debris from the gap of the blade materials 23. By performing machining of a spiral bevel gear while blowing air from the first air nozzle 51 and the second air nozzle 52, teeth generation can be achieved at high efficiency and low cost without generation of cutting debris biting. Further, it is also possible to mix a small amount of cutting oil in the air blown from the first air nozzle 51 to be blown in the form of mist.

Further, during the gear cutting, cutting is performed while blowing air from the third air nozzle 53. From the third air nozzle 53, air is blown towards other than the cutting portion of the work 35 to cool the work 35.

As necessary, it is also possible to perform cutting without blowing air from the second air nozzle 52 and the third air nozzle 53. In this case, it is also possible to use a spiral bevel gear cutting machine which is not provided with the first air nozzle 51, the second air nozzle 52 and the third air nozzle 53.

As the blade material 23, one which is made of a high-speed steel and coated with a nitride of TiAl (TiAlN) or a carbonitride of TiAl is used. Nitride of TiAl or carbonitride of TiAl coated on the blade material 23 is used in a single-layer and at least one layer of multi-layer coating. Since the blade material 23 is made of a high-speed steel, a cost reduction can be achieved at a low cost.

By coating the blade material 23 with nitride of Ti Al or carbonitride of TiAl, Al in the coating film increases in temperature by cutting heat and, as a result is oxidized by the air to form an oxide film of high wear resistance on the surface of the coating film, thus making the blade material 23 wear resistant. Further, this oxide film has an effect to suppress oxidation inside the film, thereby maintaining the adhesive strength of the coating film at a high value.

In the composition substantially comprising $(Ti_{(1-x)}Al_x)$ $(N_yC_{(1-y)})$ (where, $0.1 \leq x \leq 0.9$, $0.25 \leq y \leq 1.0$), the ratio of $(Ti_{(1-x)}Al_x)$ to $(N_yC_{(1-y)})$ is between $(Ti_{(1-x)}Al_x):(N_yC_{(1-y)})=1.1:0.9$ and $(Ti_{(1-x)}Al_x):(N_yC_{(1-y)})=0.9:1.1$. That is, in $(Ti_zAl_xM_{(1-z-x)})_{(1-w)}(N_yC_{(1-y)})_w$, is $0.45 \leq w \leq 0.55$.

Normally, the ratio of $(Ti_{(1-x)}Al_x)$ to $(N_yC_{(1-y)})$ is set to 1:1, however, there is no problem even if N and C are added in larger amounts to Ti and Al which are metal elements, to obtain a solid solution reinforcing effect.

The gear cutting method according to the present invention using the above-described annular milling cutter 21 will be described. Using a blade material 23 made of a high-speed steel (SKH55) coated with one layer of 1.7 μm thick film of a composition comprising $(Ti_{(1-x)}Al_x)N$ as the blade material 23 of the annular milling cutter 21, cutting is performed without the supply of a cutting oil (dry cutting).

Figure 4:
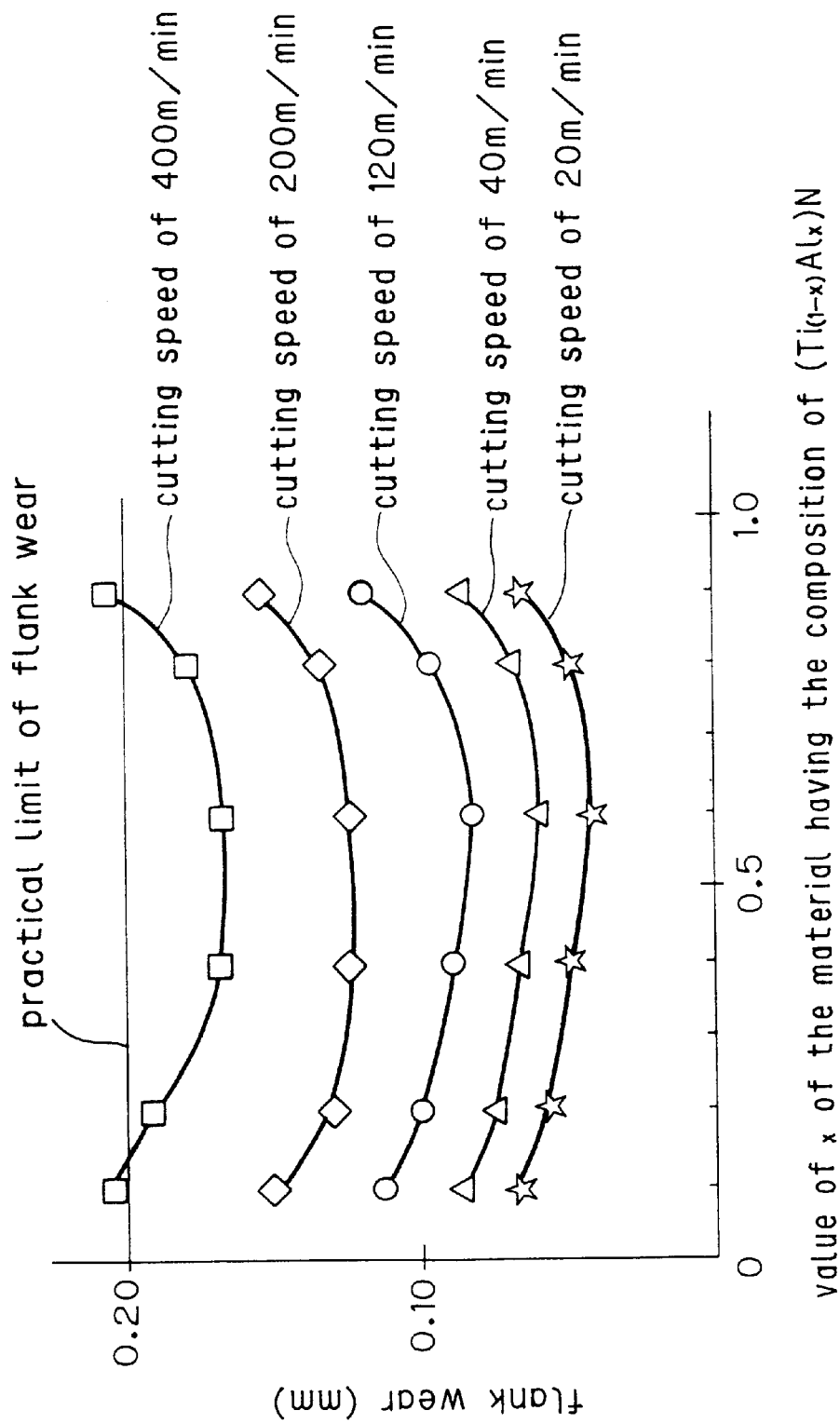
FIG. 4 is a graph showing the state of flank wear.
Figure 5:
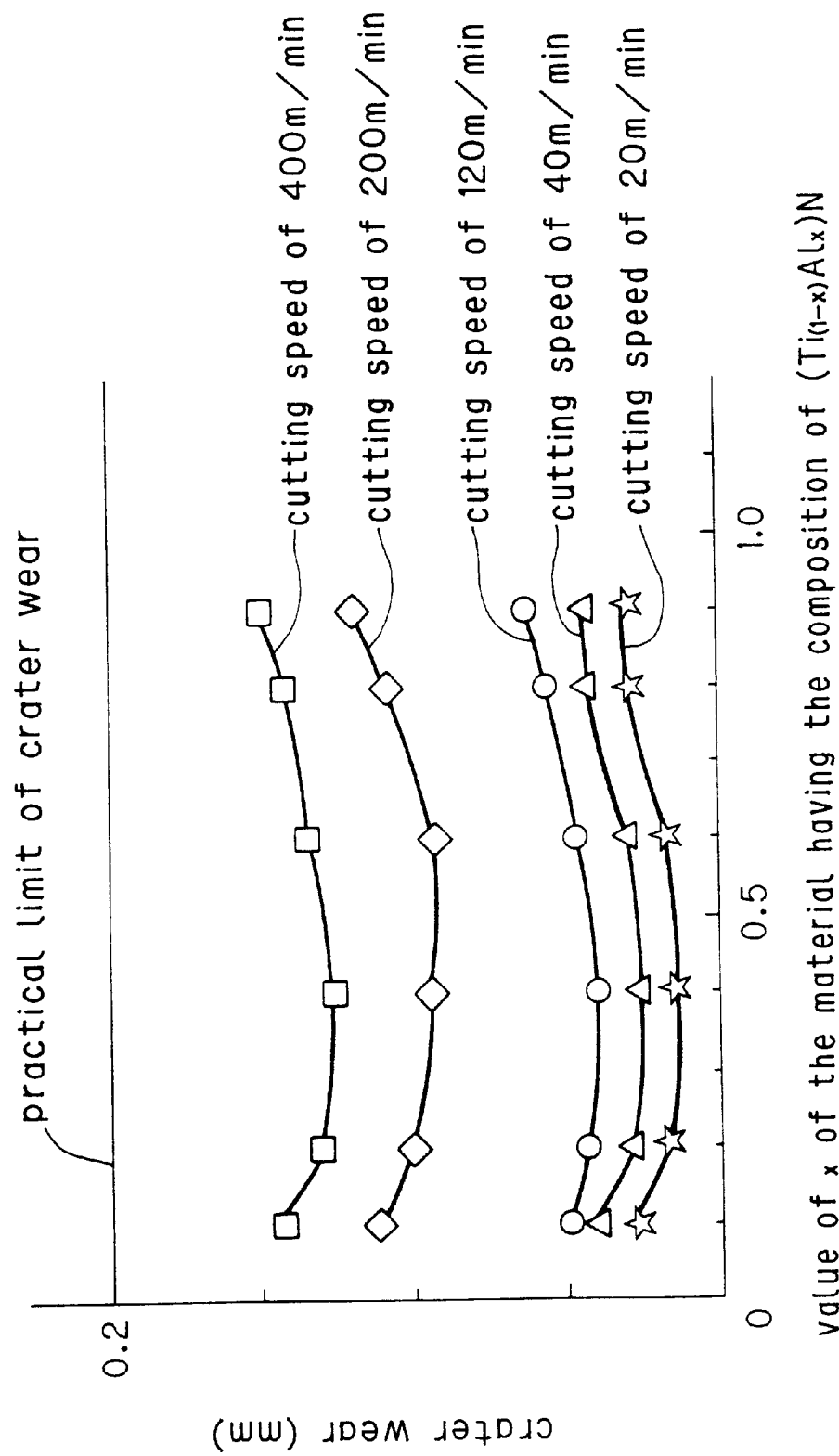
FIG. 5 is a graph showing the state of crater wear.

FIG. 4 illustrates the relationship between the value of x of the material having the composition of $(Ti_{(1-x)}Al_x)N$ and flank wear, and FIG. 5 illustrates the value of x of the material having the composition of $(Ti_{(1-x)}Al_x)N$ vs. crater wear. The blade material 23 in FIGS. 4 and 5 is a high-speed steel coated with one layer of a material of a composition of $(Ti_{(1-x)}Al_x)N$, with a point width P of 0.06 inch, a pressure angle S of 10 to 20 degrees, and directed in the right direction. Further, the main body 22 has a size of 6 inches, and the work is of a material of SCM435, the number of works to be machined is 300, and the cutting speed is varied at 20 m/min, 40 m/min, 120 m/min, 200 m/min, and 400 m/min.

As shown in FIGS. 4 and 5, the blade material 23 coated with a film of a composition of $(Ti_{(1-x)}Al_x)N$ with an x value in the range of $0.2 \leq x \leq 0.85$ is below a practical limit (0.2 mm) in terms of flank wear and crater wear at cutting speeds of 20 m/min, 40 m/min, 120 m/min, 200 m/min, and 400 m/min and is thus employable practically.

As described above, when a bevel gear is generated by dry cutting using the annular milling cutter 21 applied with the blade material 23 made of a high-speed steel coated with a film of a composition of $(Ti_{(1-x)}Al_x)N$ with an x value in the range of $0.2 \leq x \leq 0.85$ at a cutting speed of 400 m/min or less, teeth generation in high efficiency at low cost can be achieved. It is even further preferable when the cutting speed is 40 to 120 m/min.

A second embodiment of the gear cutting method of the present invention will be described. Using a blade material 23 made of a high-speed steel (SKH55) coated with one layer of 1.7 μm thick film of a composition comprising $(Ti_{0.5}Al_{0.5})(N_yC_{(1-y)})$ as the blade material 23 of the annular milling cutter 21, cutting is performed without the supply of a cutting oil (dry cutting).

Figure 6:
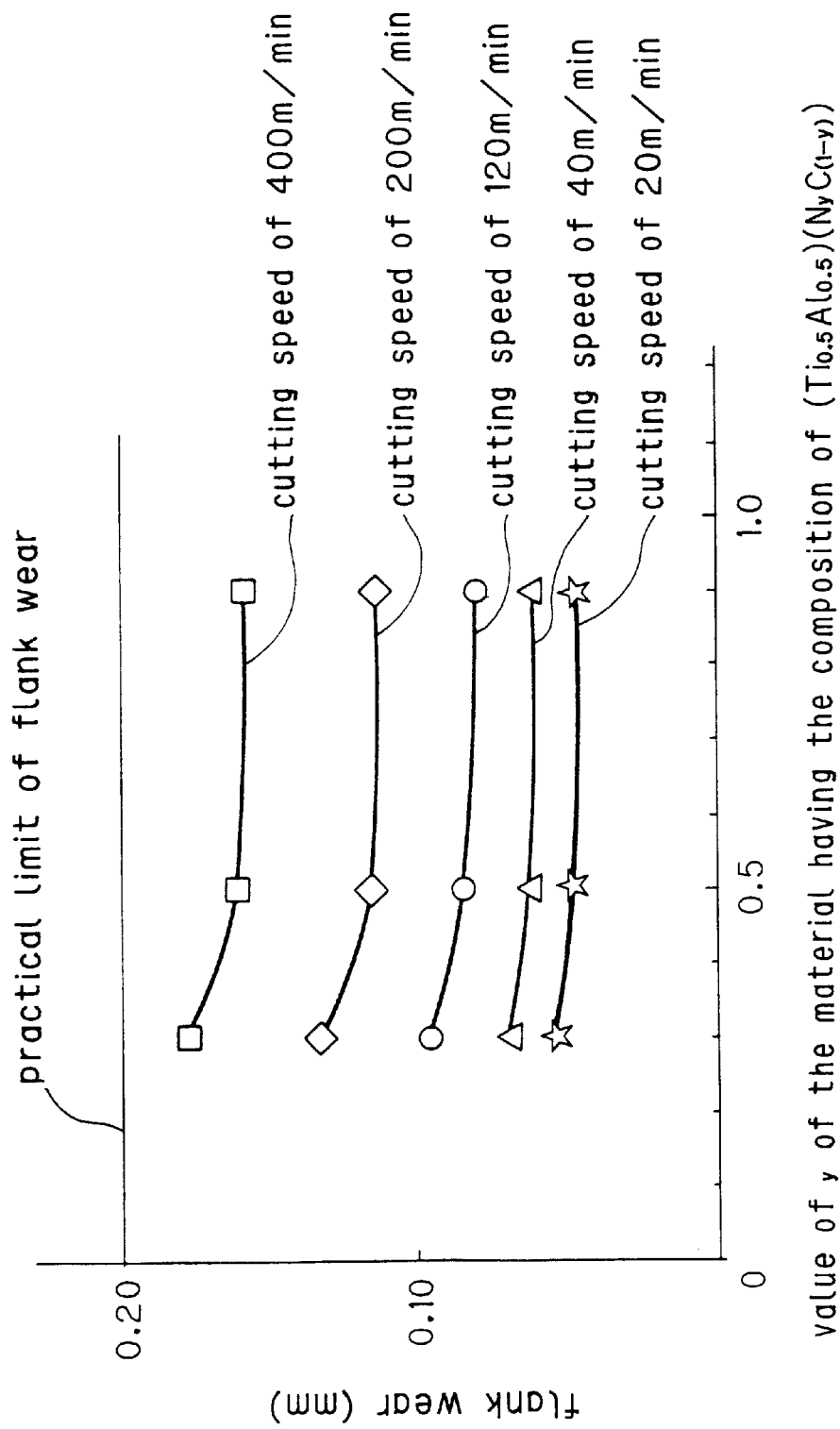
FIG. 6 is a graph showing the state of flank wear.
Figure 7:
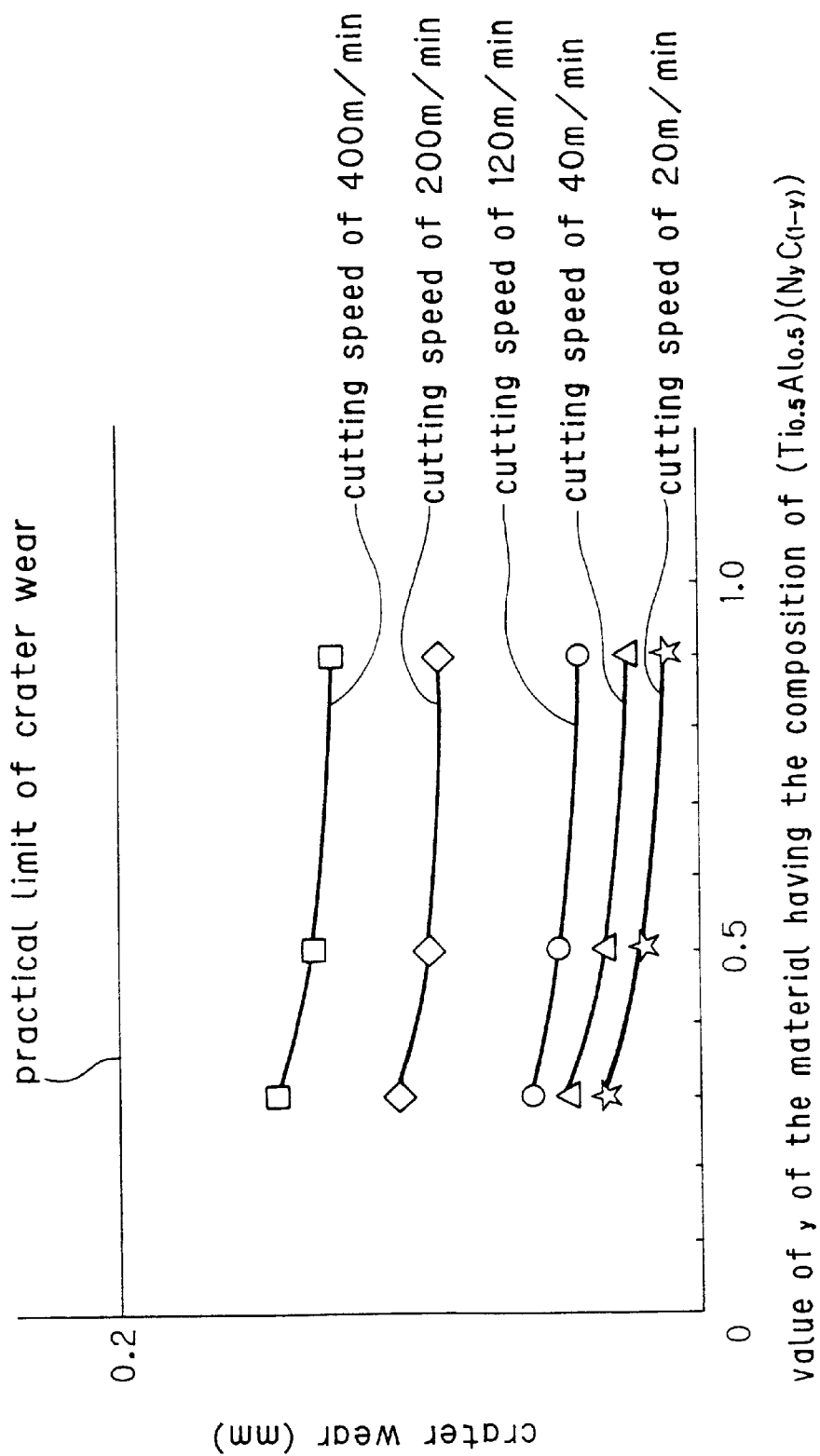
FIG. 7 is a graph showing the state of crater wear.

FIG. 6 shows the value of y of the material having the composition $(Ti_{0.5}Al_{0.5})(N_yC_{(1-y)})$ vs. flank wear, and FIG. 7 shows the value of y of the material having the composition comprising $(Ti_{0.5}Al_{0.5})(N_yC_{(1-y)})$ vs. crater wear. The blade material 23 in FIGS. 6 and 7 is a high-speed steel coated with one layer of a film of a composition comprising $(Ti_{0.5}Al_{0.5})(N_yC_{(1-y)})$, with a point width P of 0.06 inch, a pressure angle S of 10 to 20 degrees, and directed in the right direction, and the work is of a material of SCM435, the number of works to be machined is 300, and the cutting speed is varied at 20 m/min, 40 m/min, 120 m/min, 200 m/min, and 400 m/min.

As shown in FIGS. 6 and 7, the blade material 23 coated with a film of a composition of $(Ti_{0.5}Al_{0.5})(N_yC_{(1-y)})$ with a y value in the range of $0.2 \leq y \leq 1.0$ is below a practical limit (0.2 mm) in terms of flank wear and crater wear at cutting speeds of 20 m/min, 40 m/min, 120 m/min, 200 m/min, and 400 m/min and is thus employable practically.

As described above, when a bevel gear is generated by dry cutting using the annular milling cutter 21 applied with the blade material 23 made of a high-speed steel coated with a film of a composition of $(Ti_{0.5}Al_{0.5})(N_yC_{(1-y)})$ with a y value in the range of $0.2 \leq y \leq 1.0$ at a cutting speed of 400 m/min or less, teeth generation in high efficiency at low cost can be achieved. It is even further preferable when the cutting speed is 40 to 120 m/min.

A third embodiment of the gear cutting method of the present invention will be described. Using a blade material 23 made of a high-speed steel (SKH55) coated with a film of a thickness varied in the range of $0.5 \leq d \leq 1.7$ μm of a composition comprising $(Ti_{0.5}Al_{0.5})N$ as the blade material 23 of the annular milling cutter 21, cutting is performed without the supply of a cutting oil (dry cutting). A film thickness d is when a single layer of $(Ti_{0.5}Al_{0.5})N$ is used or a total thickness when a 0.05 μm thick TiN is inserted in-between to form a multilayered film. Further, the blade material 23 has a point width P of 0.06 inch, a pressure angle S of 10 to 20 degrees, and is directed in the right direction. Still further, the main body 22 of the annular milling cutter 21 has a size of 6 inches, and the work is of a material of SCM435 and the number of works to be machined is 300.

Figure 8:
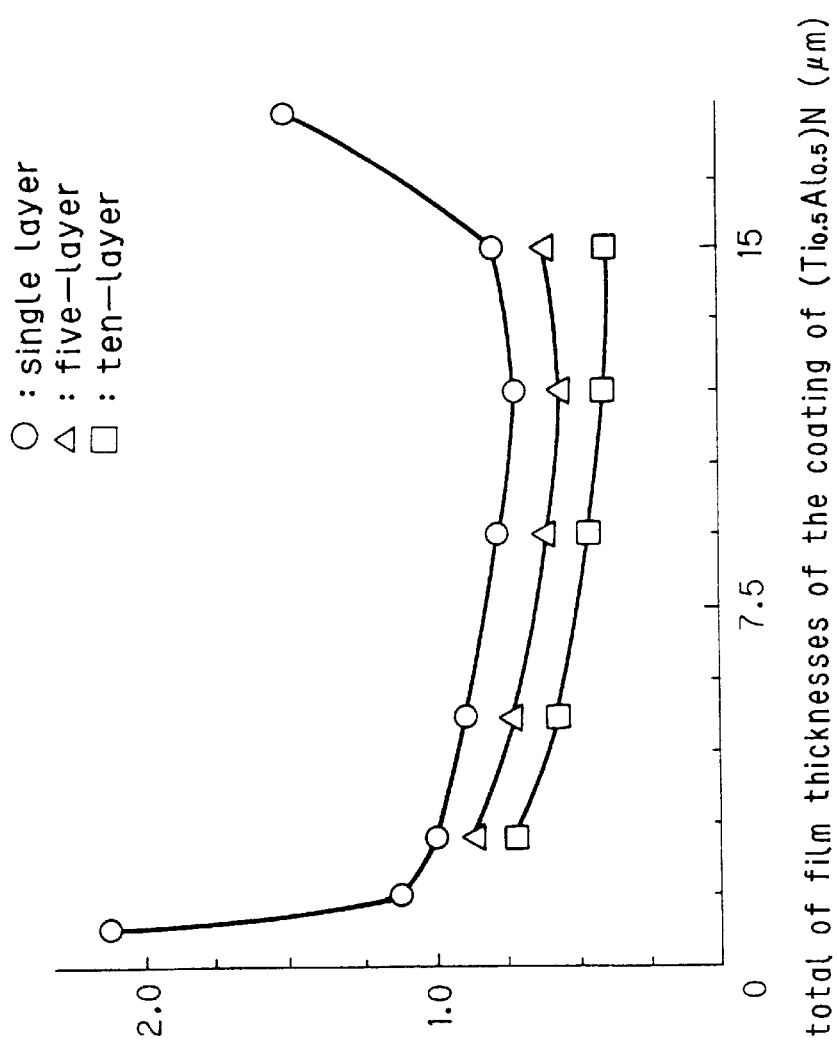
FIG. 8 is a graph showing a relation between film thickness and flank wear.

FIG. 8 is a graph for determining an appropriate thickness of the coating of $(Ti_{0.5}Al_{0.5})N$, in which the axis of abscissa represents the total of film thicknesses. In the same figure, if the $(Ti_{0.5}Al_{0.5})N$ coating is a single layer, the thickness thereof is represented, while in the case of a multi-layer coating, the total of all the film thicknesses is represented. The axis of ordinate represents the ratio of flank wear, assuming that the flank wear of the blade material 23 having a single layer of 1.7 μm thick $(Ti_{0.5}Al_{0.5})N$ coating is 1.

In the case of single layer coating of $(Ti_{0.5}Al_{0.5})N$, the flank wear ratio increases when the film thickness is smaller than 1 μm and in the vicinity where the film thickness is greater than 16 μm. In the case of multi-layered coating of $(Ti_{0.5}Al_{0.5})N$, wear is decreased as compared with the case of single layer coating. Therefore, It is preferable that the film thickness be in the range of 1 μm to 16 μm, and it is optional whether the coating is of a single layer or of a plurality of layers.

A fourth embodiment of the gear cutting method of the present invention will be described. Using a blade material 23 made of a high-speed steel (SKH55) coated with one layer of film of a composition comprising $(Ti_{0.5}Al_{0.5})N$ as the blade material 23 of the annular milling cutter 21, cutting is performed while varying the axial feed without the supply of a cutting oil (dry cutting). The blade material 23 has a point width P of 0.06 inch, a pressure angle S of 10 to 20 degrees, and is directed in the right direction. Further, the main body 22 of the annular milling cutter 21 has a size of 6 inches, and the work is of a material of SCM435 and the number of works to be machined is 300.

Figure 9:
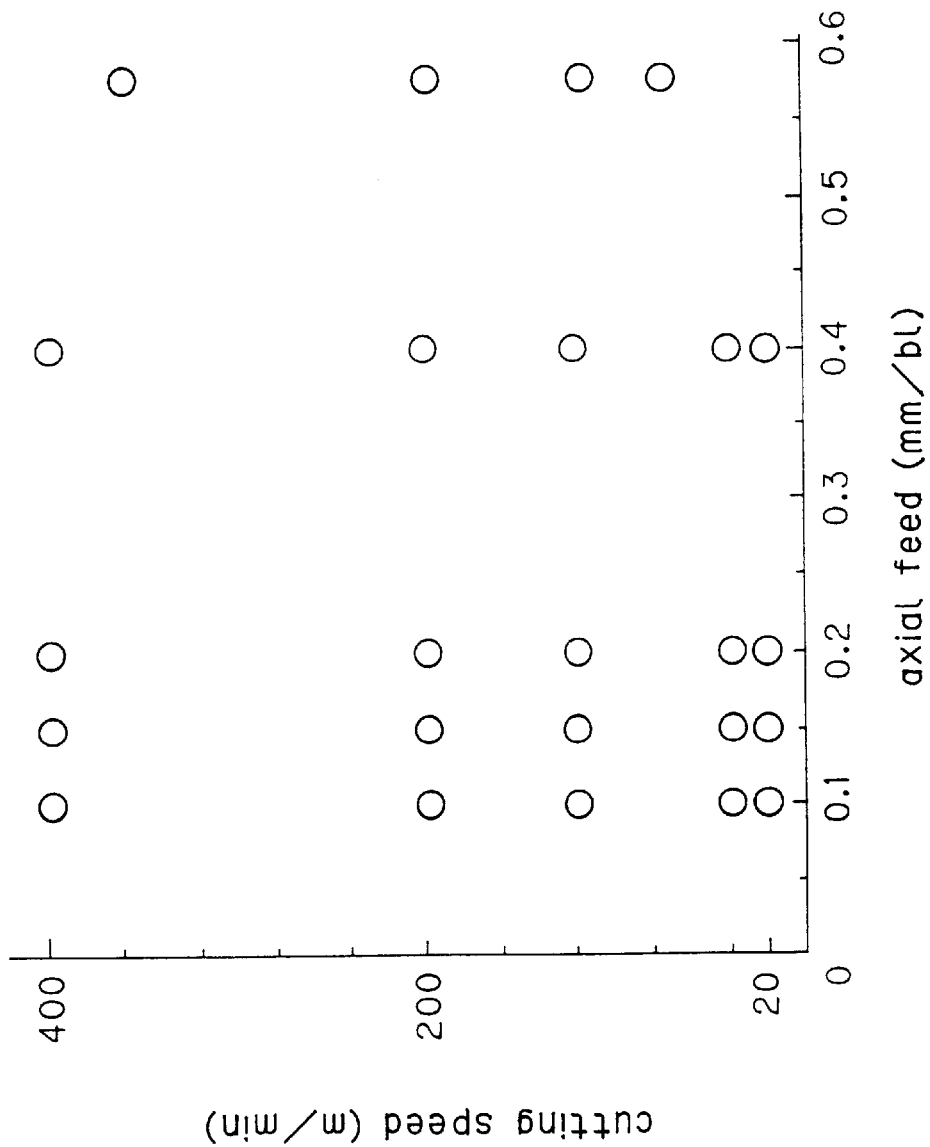
FIG. 9 is a graph showing a relation between axial feed and the cutting speed.

FIG. 9 shows cutting speeds vs. axial feed falling under a practicable range of flank wear and crater wear. As shown in the figure, when the axial feed is 0.58 mm/bl, wear is in a practicable area up to a cutting speed of 360 m/min.

A fifth embodiment of the gear cutting method of the present invention will be described. Using a blade material 23 made of a high-speed steel coated with one layer of 1.7 μm thick film of a composition comprising $(Ti_{0.5}Al_{0.5})N$ as the blade material 23 of the annular milling cutter 21, cutting is performed while changing the work material without the supply of a cutting oil (dry cutting).

Specifically, a cutting speed range in which drying cutting is effective (where the wear falls below a practical limit) is checked, using a variety of typical gear materials as the work, including carburized steels and case-hardening steels (SCM435 or the like), carbon steels (S45C or the like), cast iron (FCD50 or the like) and at different hardnesses. The blade material 23 has a point width P of 0.06 inch, a pressure angle S of 10 to 20 degrees, and is directed in the right direction. Further, the main body 22 of the annular milling cutter 21 has a size of 6 inches, and the number of works to be machined is 300.

Figure 10:
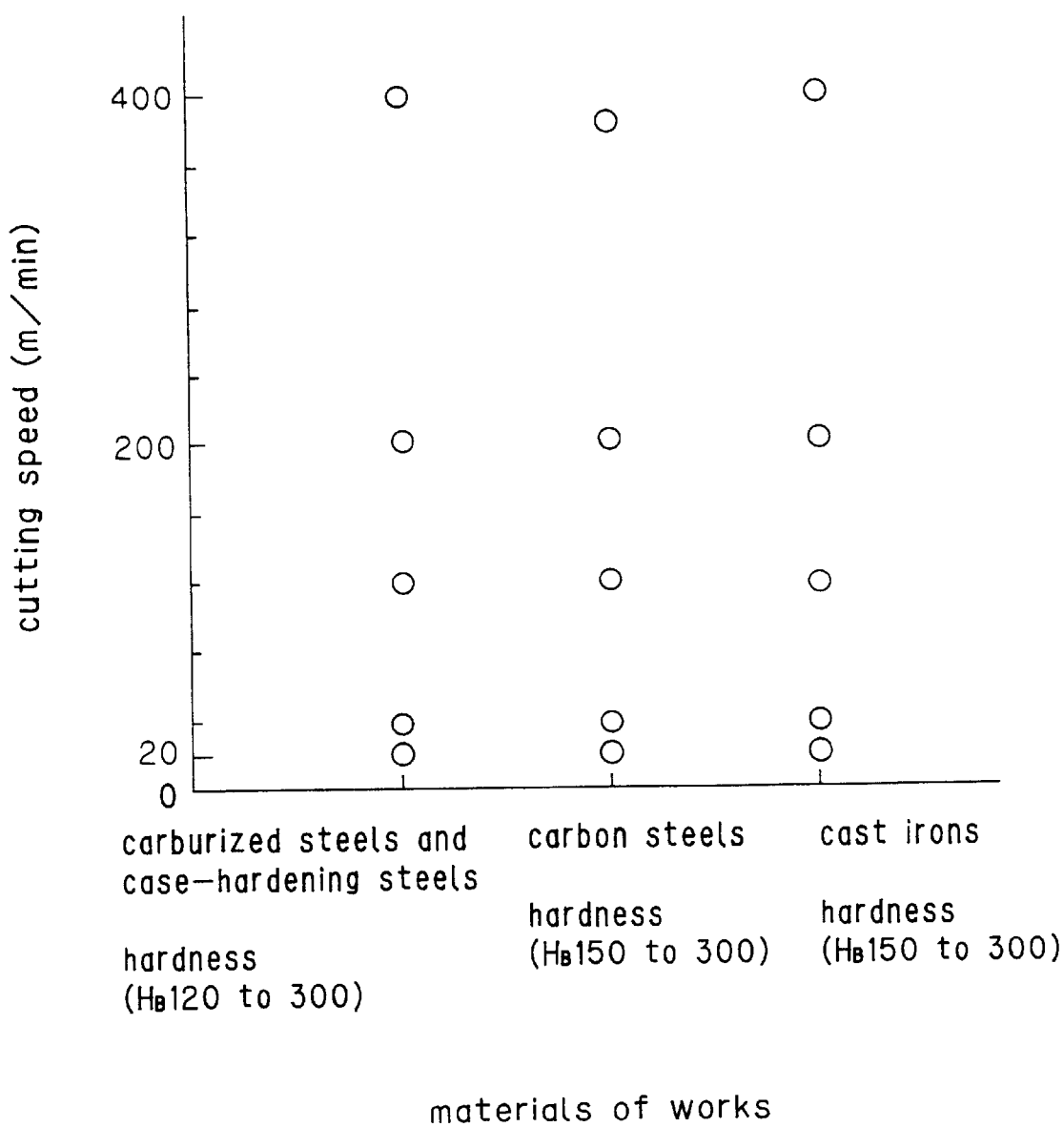
FIG. 10 is a graph showing a relation between work material and the cutting speed.

FIG. 10 illustrates materials of works vs. cutting speeds falling under a practicable range of flank wear and crater wear. As shown in the figure, for carbon steels, the wear falls within the practical range up to a cutting speed of 380 m/min.

A sixth embodiment of the gear cutting method of the present invention will be described. Using a blade material 23 made of a high-speed steel coated with one layer of 1.7 μm thick film of a composition comprising $(Ti_{0.5}Al_{0.5})N$ as the blade material 23 of the annular milling cutter 21, cutting is performed while changing the material of the blade material 23 in five types of high-speed steel without the supply of a cutting oil (dry cutting).

Specifically, SKH51, SKH55, powdered high-speed steels (1.6% C, 8% W, 6% Mo, etc.), powdered high-speed steels (2.2% C, 12% W, 2.5% Mo, etc.), and powdered high-speed steels (1.3% C, 6% W, 5% Mo, etc.) were used as materials of the blade material 23 and an area of cutting speed effective for dry cutting was checked with respect to each of those materials. The blade material 23 has a point width P of 0.06 inch, a pressure angle S of 10 to 20 degrees, and is directed in the right direction. Further, the main body 22 of the annular milling cutter 21 has a size of 6 inches, and the work is of a material of SCM435 and the number of works to be machined is 300.

Figure 11:
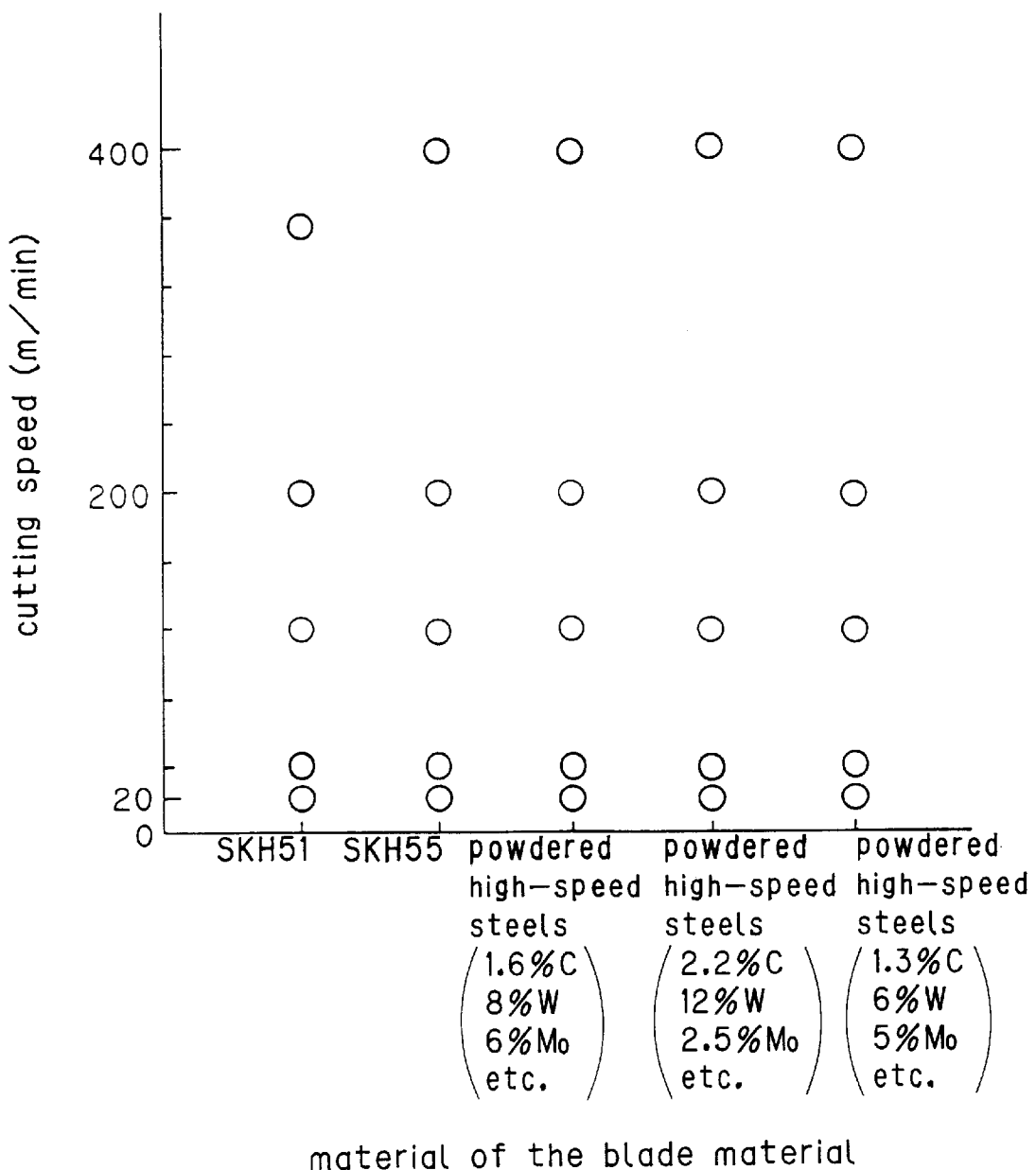
FIG. 11 is a graph showing a relation between blade material and the cutting speed.

FIG. 11 illustrates material types of the blade material 23 vs. cutting speeds falling within a practicable range in terms of the flank wear and crater wear. As shown in the figure, when the material of the blade material 23 is SKH51, the wear was within the practicable range at a cutting speed of up to 350 m/min.

A seventh embodiment of the gear cutting method of the present invention will be described. Using a blade material 23 made of a high-speed steel (SKH55) coated with one layer of 1.7 μm thick film of a composition comprising $(Ti_{0.5}Al_{0.5})N$ as the blade material 23 of the annular milling cutter 21, cutting is performed while changing the size of the main body 22 and the point width P the blade material 23 without the supply of a cutting oil (dry cutting).

Specifically, the point width P was set to 0.06 inch when the size of the main body 22 of the annular milling cutter 21 was 6 inches, to 0.10 inch when the size of the main body 22 of the annular milling cutter 21 was 9 inches, and to 0.14 inch when the size of the main body 22 of the annular milling cutter 21 was 12 inches. The blade material 23 has a pressure angle S of 10 to 20 degrees, and is directed in the right direction. Further, the work is of a material of SCM435 and the number of works to be machined is 300.

Figure 12:
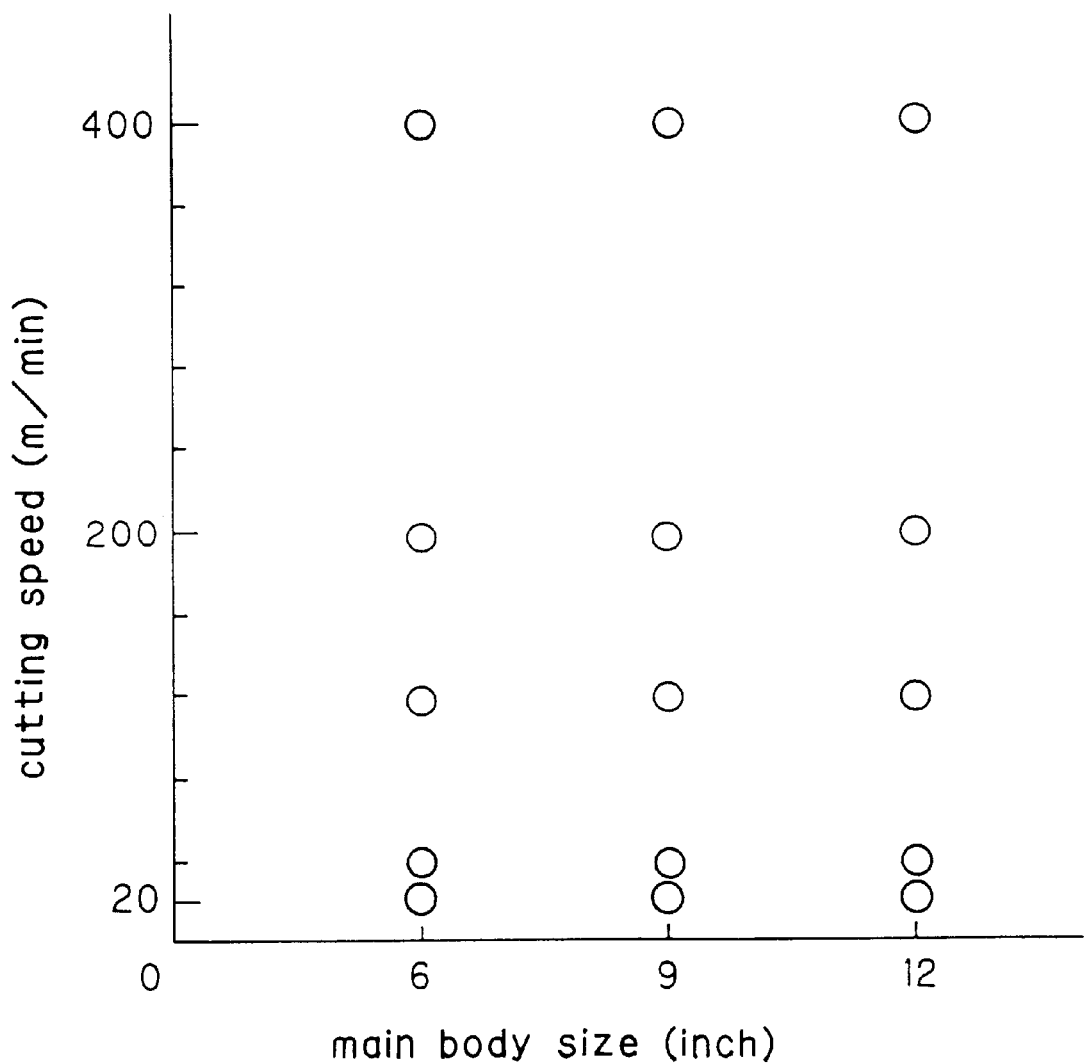
FIG. 12 is a graph showing a relation between main body size and the cutting speed.
Figure 13:
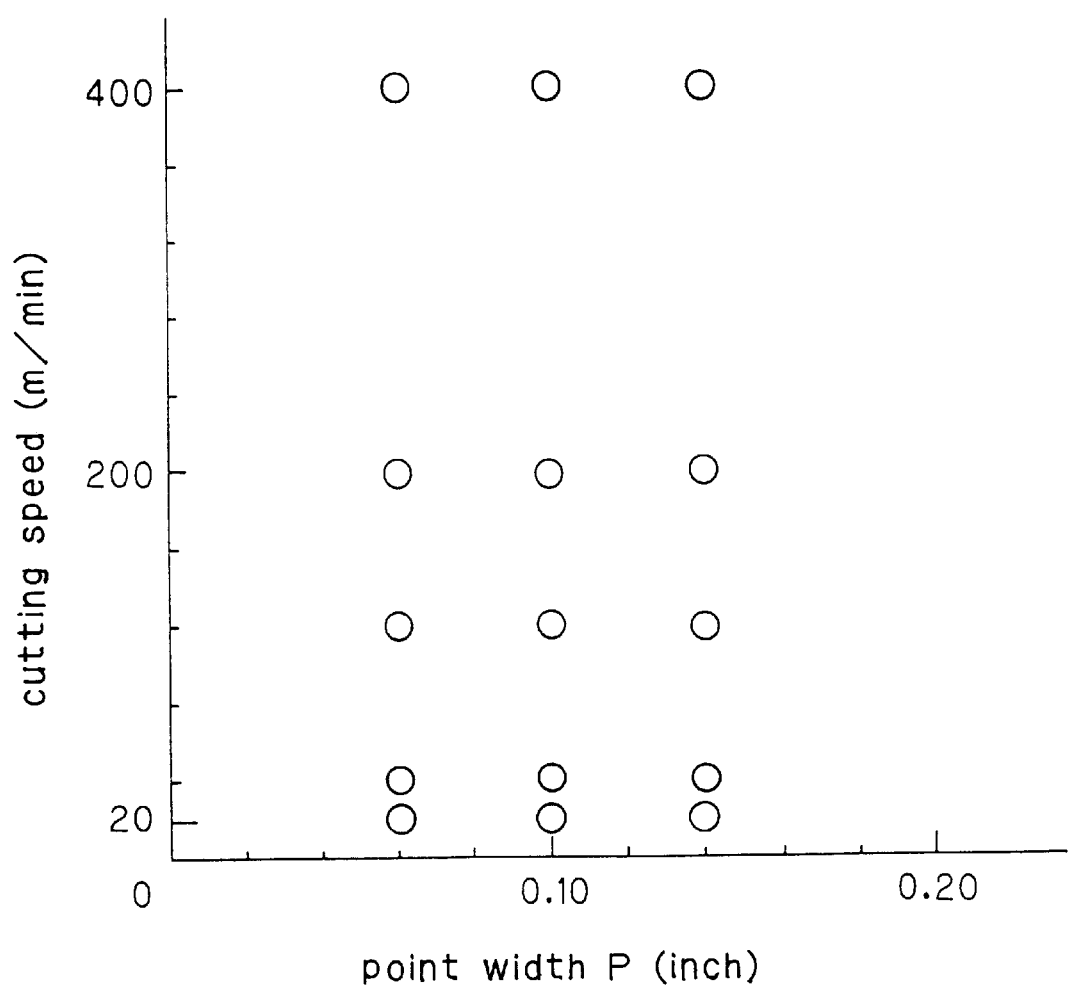
FIG. 13 is a graph showing a relation between point width and the cutting speed.

FIG. 12 illustrates the size of the main body 22 of the annular milling cutter 21 vs. cutting speeds falling within a practicable range in terms of the flank wear and crater wear. As shown in the figure, the wear was within the practicable range in all conditions in terms of the size of the main body 22 and the point width P of the blade material 23.

Figure 14:
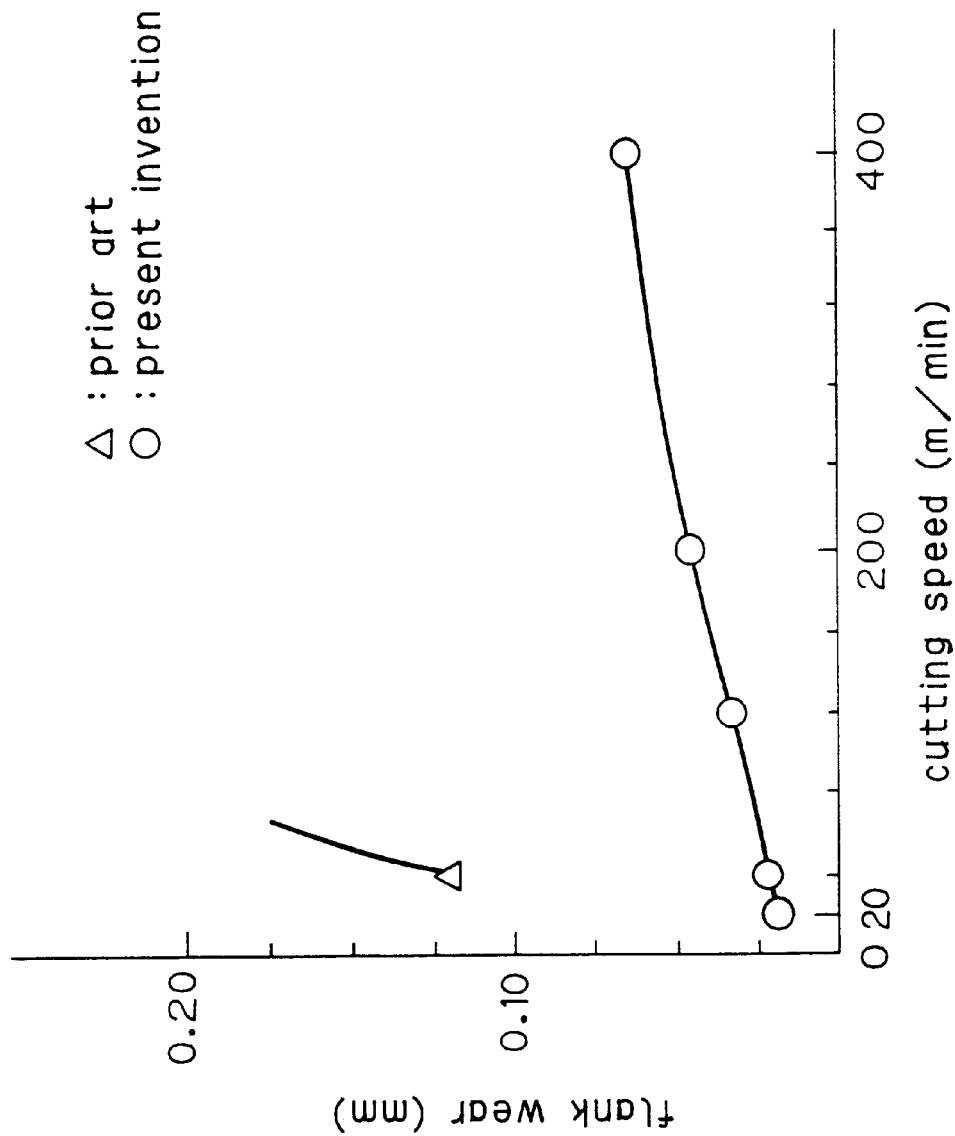
FIG. 14 is a graph showing comparison with the prior art.
Figure 15:
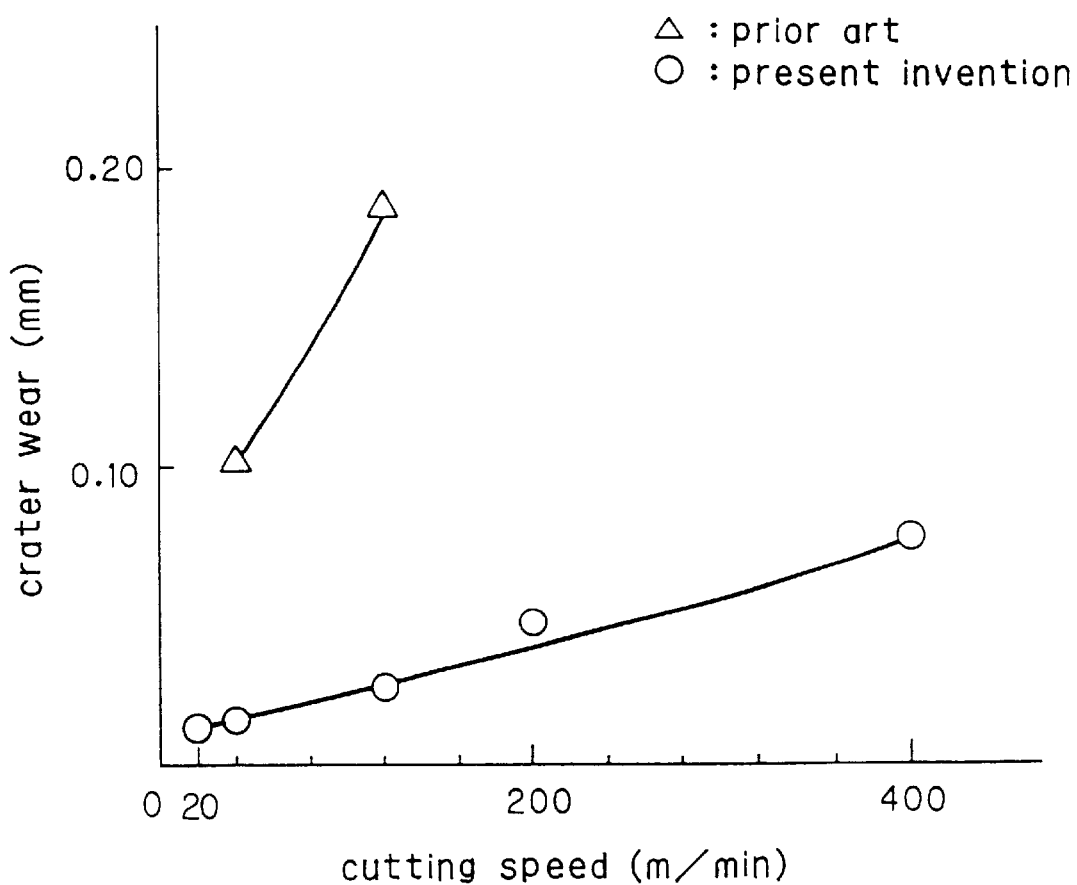
FIG. 15 is a graph showing comparison with the prior art.

FIGS. 14 and 15 illustrate cutting speeds vs. flank wear and crater wear in the case of the present invention in which dry cutting is performed without the supply of a cutting oil using the blade material 23 made of a high-speed steel as a base material coated with a film of a composition comprising $(Ti_{(1-x)}Al_x)(N_yC_{(1-y)})$: $0.2 \leq x \leq 0.85$, $0.2 \leq y \leq 1.0$, and in a case in which cutting is performed under the supply of a prior art cutting oil, respectively. As shown in the figures, it can be seen that in the case of the present invention, both the flank wear and crater wear are improved as compared with the prior art, and progress of wear is small even at higher-speed machining.

Next, another example of film coated on the blade material 23 will be described. The blade material 23 is used which is coated with nitride of TiAl containing a nitride forming element capable of forming a high-quality nitride or carbonitride of TiAl. Nitride of TiAl containing a nitride forming element or carbonitride of TiAl coated on the blade material 23 is used in a single-layer and at least one layer of multi-layer coating. Here, as the nitride forming elements, Zr (zirconium), Hf (hafnium), Y (yttrium), V (vanadium), Nb (niobium), Ta (tantalum), Si (silicon), Cr (chromium), Mo (molybdenum), W (tungsten), B (boron), Mg (magnesium), Ca (calcium), and Be (beryllium) are applied.

Specifically, where the nitride forming element is represented by M, the blade material 23 used is coated with at least one layer of a film of a composition substantially comprising: $(Ti_zAl_xM_{(1-z-x)})_{(1-w)}(N_yC_{(1-y)})_w$ (where, $0.2 \leq x \leq 0.85$, $0.2 \leq y \leq 1.0$, $0.15 \leq z \leq 0.8$, $0.7 \leq (z+x) \leq 1.0$ and $0.45 \leq w \leq 0.55$).

Further, by specifying the range of value x in $(Ti_zAl_xM_{(1-z-x)})_{(1-w)}(N_yC_{(1-y)})_w$ to $0.2 \leq x \leq 0.85$ and the range of value y to $0.2 \leq y \leq 1.0$, the range of value z is 1 subtracted by x ($z=1-x$). Therefore, TiAl,NC has the same compositional range as the above case where no nitride forming element M is added, and almost the same effects as the result shown in FIGS. 4 to 15 are obtained. By adding the nitride forming element M, the nitride forming element M is possible to substitute TiAl and form a high-quality nitride.

Figure 16:
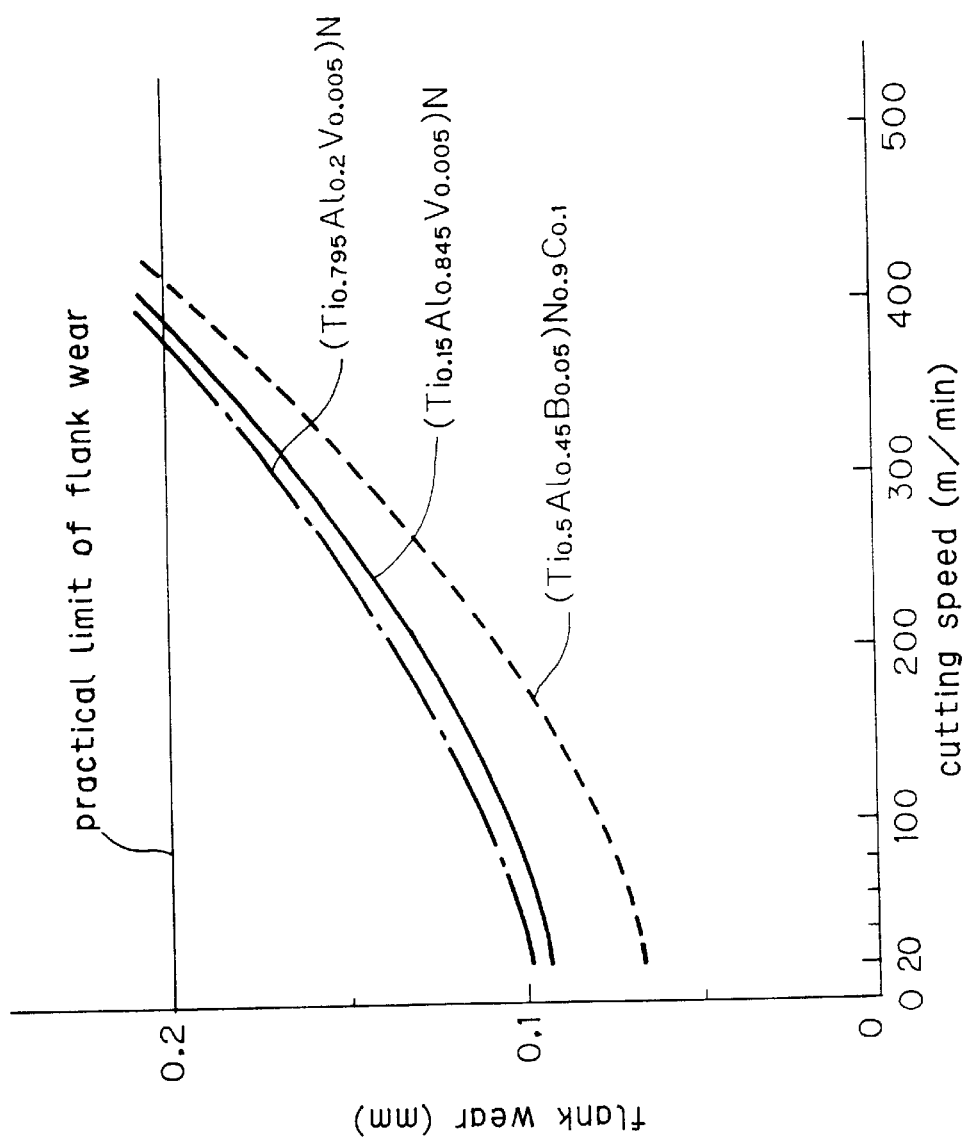
FIG. 16 is a graph showing a relation between flank wear and the cutting speed when coated with $Ti_zAl_xM_{(1-z-x)})_{(1-w)}(N_yC_{(1-y)})_w$.

In the following, cases in which V (vanadium), B (boron), and Zr (zirconium) are applied as typical nitride forming elements M will be described in detail with reference to FIGS. 16 to 18. FIG. 16 shows a relation between cutting speed and flank wear when small amounts of V and B are added, and FIG. 17 shows a relation between cutting speed and flank wear when V, B and Zr are added in larger amounts than in FIG. 16.

Here, the blade material 23 has a point width P of 0.06 inch, a pressure angle S of 10 to 20 degrees, and is directed in the right direction. Further, the main body 22 of the annular milling cutter 21 has a size of 6 inches, and the work is of a material of SCM435 and the number of works to be machined is 300.

As shown in FIG. 16, when the blade material 23 is coated with a film of the composition comprising $(Ti_{0.795}Al_{0.2}V_{0.005})N$, $(Ti_{0.15}Al_{0.845}V_{0.005})N$, $(Ti_{0.5}Al_{0.45}B_{0.05})(N_{0.9}C_{0.1})$ as $(Ti_zAl_xM_{(1-z-x)})_{(1-w)}(N_yC_{(1-y)})_w$, the flank wear is below the practical wear limit (0.20 mm) at the cutting speeds of less than the vicinity of 400 m/min. For this reason, a high efficiency and low-cost machining same as with no addition of nitride forming element can be achieved even when V and B as nitride forming elements are added in small amounts. Although not shown in the figure, also as to crater wear it has been confirmed that the wear falls below the practical wear limit.

Figure 17:
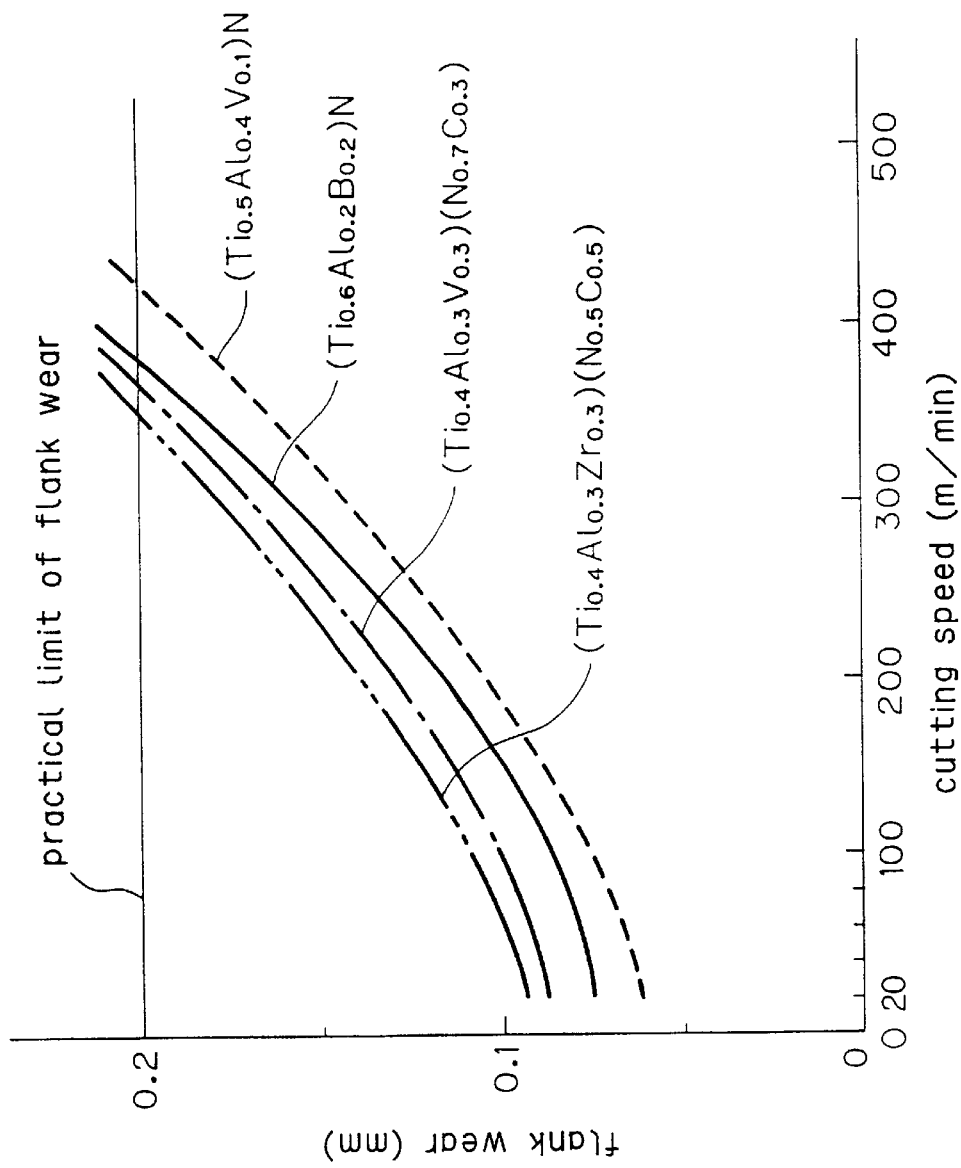
FIG. 17 is a graph showing a relation between flank wear and the cutting speed when coated with $(Ti_zAl_xM_{(1-z-x)})_{(1-w)}(N_yC_{(1-y)})_w$.

As shown in FIG. 17, when the blade material 23 is coated with at least one layer of a film of the composition comprising $(Ti_{0.5}Al_{0.4}V_{0.1})N$, $(Ti_{0.6}Al_{0.2}B_{0.2}N$, $(Ti_{0.5}Al_{0.3}V_{0.3})(N_{0.7}C_{0.3})$, $(Ti_{0.4}Al_{0.3}Zr_{0.3})(N_{0.5}C_{0.5})$ as $(Ti_zAl_xM_{(1-z-x)})_{(1-w)}(N_yC_{(1-y)})_w$, the flank wear is below the practical wear limit (0.20 mm) at the cutting speeds of less than the vicinity of 400 m/min. For this reason, a high efficiency and low-cost machining same as with no addition of nitride forming element can be achieved even when V, B and Zr as nitride forming elements are added in larger amounts than in FIG. 16. Although not shown in the figure, also as to crater wear it has been confirmed that the wear falls below the practical wear limit.

Because if the amount of the nitride forming element added exceeds 0.3 as compared with the composition of TiAl addition elements, film peeling is liable to occur, it is preferable that the amount of the nitride forming element added is 0.3 or less as compared with the composition of the TiAl addition elements. If the amount of the nitride forming element added exceeds 0.3 as compared with the composition of the TiAl addition elements (z+x is below 0.7), that is, if the content of the nitride forming element M is excessively large, the basic characteristics of TiAl are deteriorated resulting in film peeling.

Next, a case in which ratios of metal elements (TiAl, and nitride forming elements added) to nonmetallic elements (N) including C are varied will be described in detail with reference to FIG. 18. FIG. 18 shows a relation between cutting speed and flank wear when the compositional ratio of metal elements to nonmetallic element including C is varied in the range between 0.45 and 0.55. Machining conditions and the like are the same as in the case shown in FIGS. 16 and 17. The coating film is a single layer with a film thickness of 1.7 μm.

Figure 18:
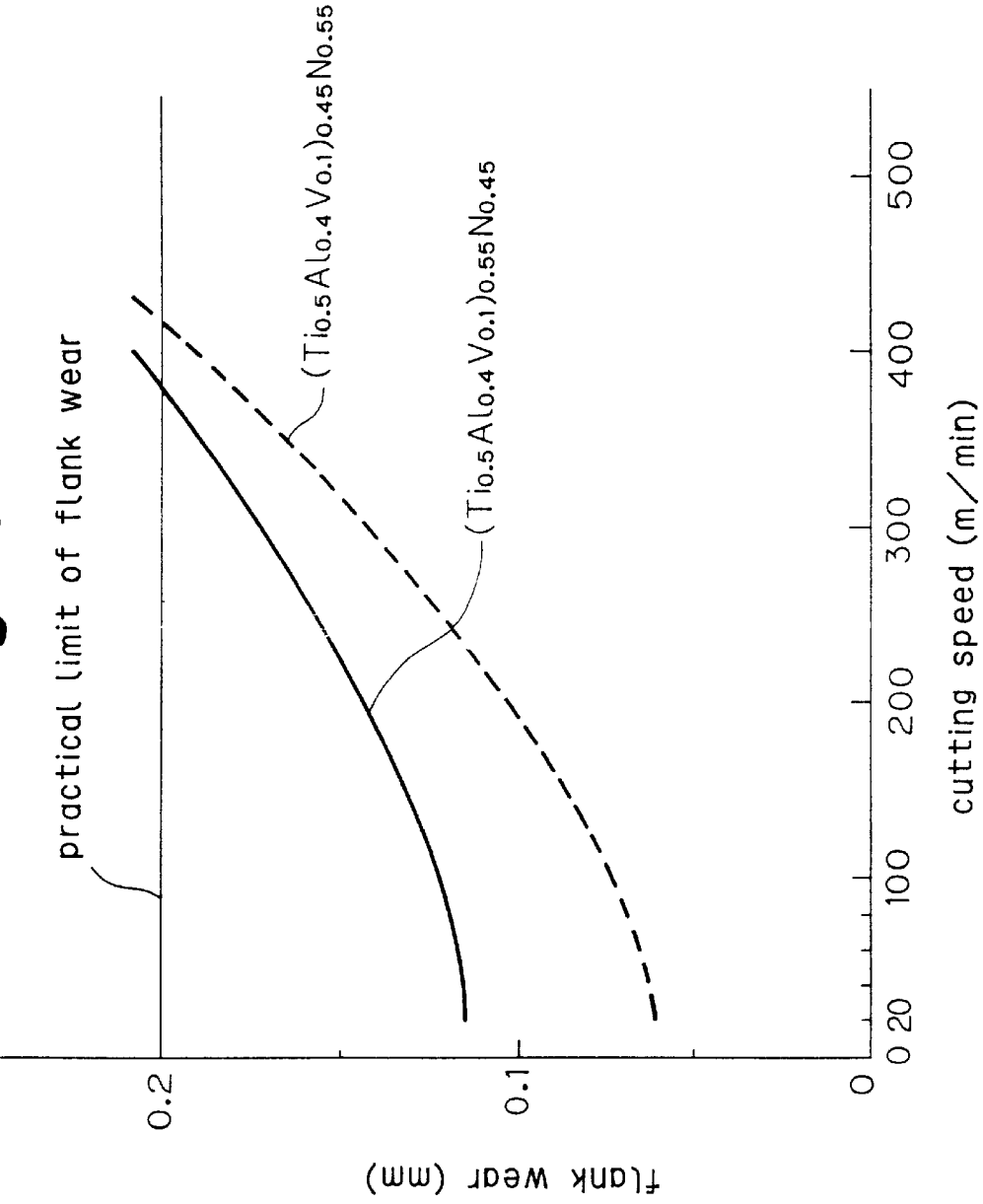
FIG. 18 is a graph showing a relation between flank wear and the cutting speed when coated with $(Ti_zAl_xM_{(1-z-x)})_{(1-w)}(N_yC_{(1-y)})_w$.

As shown in FIG. 18, when the blade material 23 is coated with at least one layer of a film of the composition $(Ti_{0.5}Al_{0.4}V_{0.1})_{0.45}N_{0.55}$ and $(Ti_{0.5}Al_{0.4}V_{0.1})_{0.55}N_{0.45}$ as $(Ti_zAl_xM_{(1-z-x)})_{(1-w)}(N_yC_{(1-y)})_w$, in any case where the amount of metal elements is large or the amount of nonmetallic elements including C is large, the flank wear falls below the practical wear limit (0.20 m) at the cutting speeds from the vicinity of about 400 m/min or less, thus achieving high efficiency low-cost machining. Although not shown in the figure, also as to crater wear it has been confirmed that the wear falls below the practical wear limit at the cutting speeds from the vicinity of about 400 m/min or less. Here, the reason why the w value is set to $0.45 \leq w \leq 0.55$ is that if the w value is out of the range $0.45 \leq w \leq 0.55$, there is a fear that film peeling or deterioration of wear resistance occurs.

The ratio of $(Ti_zAl_xM_{(1-z-x)})$ to $(N_yC_{(1-y)})_w$ is normally 1:1, however, there is no problem even if the content of nonmetallic elements including C is decreased with respect to the amounts of Ti and Al as metal elements and nitride forming elements added. When nonmetallic elements including C are contained in larger amounts, solid solution reinforcement of the coating film can be expected.

As described above, even when dry cutting is performed using a blade material coated with a film containing V, B and Zr added as nitride forming elements M, the wear falls below the practical wear limit and, the same high efficiency low-cost machining as the case where V, B and Zr are not added can be realized. Further, even when dry cutting is performed using a blade material coated with a film containing elements other than V, B and Zr as nitride forming elements M, the same high efficiency low-cost machining as the case where V, B and Zr are added can be achieved.

Figure 19:
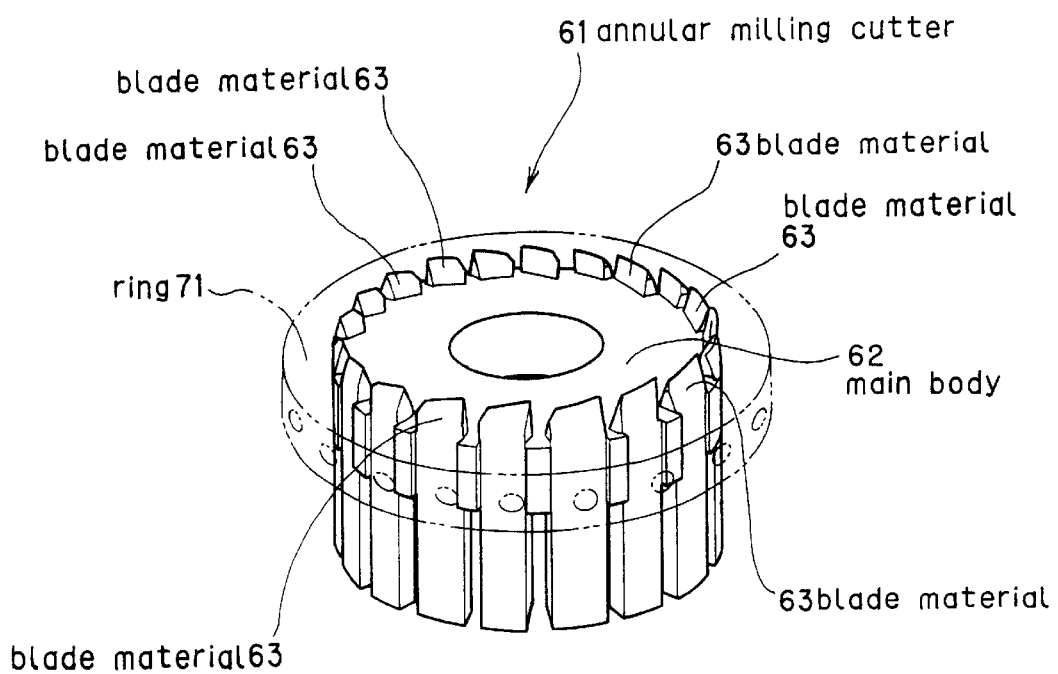
FIG. 19 is an outer appearance of an annular milling cutter according to another embodiment.
Figure 20:
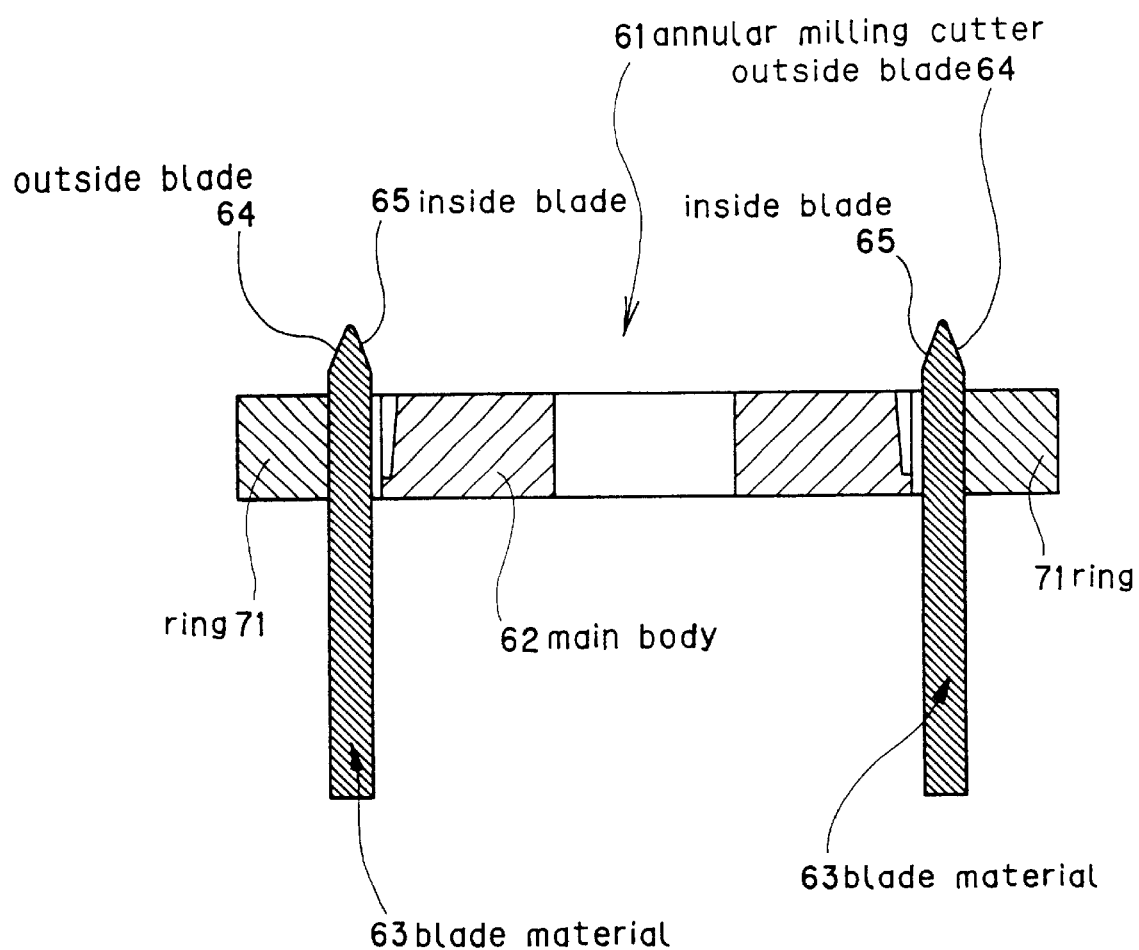
FIG. 20 is a schematic sectional diagram of an annular milling cutter.
Figure 21:
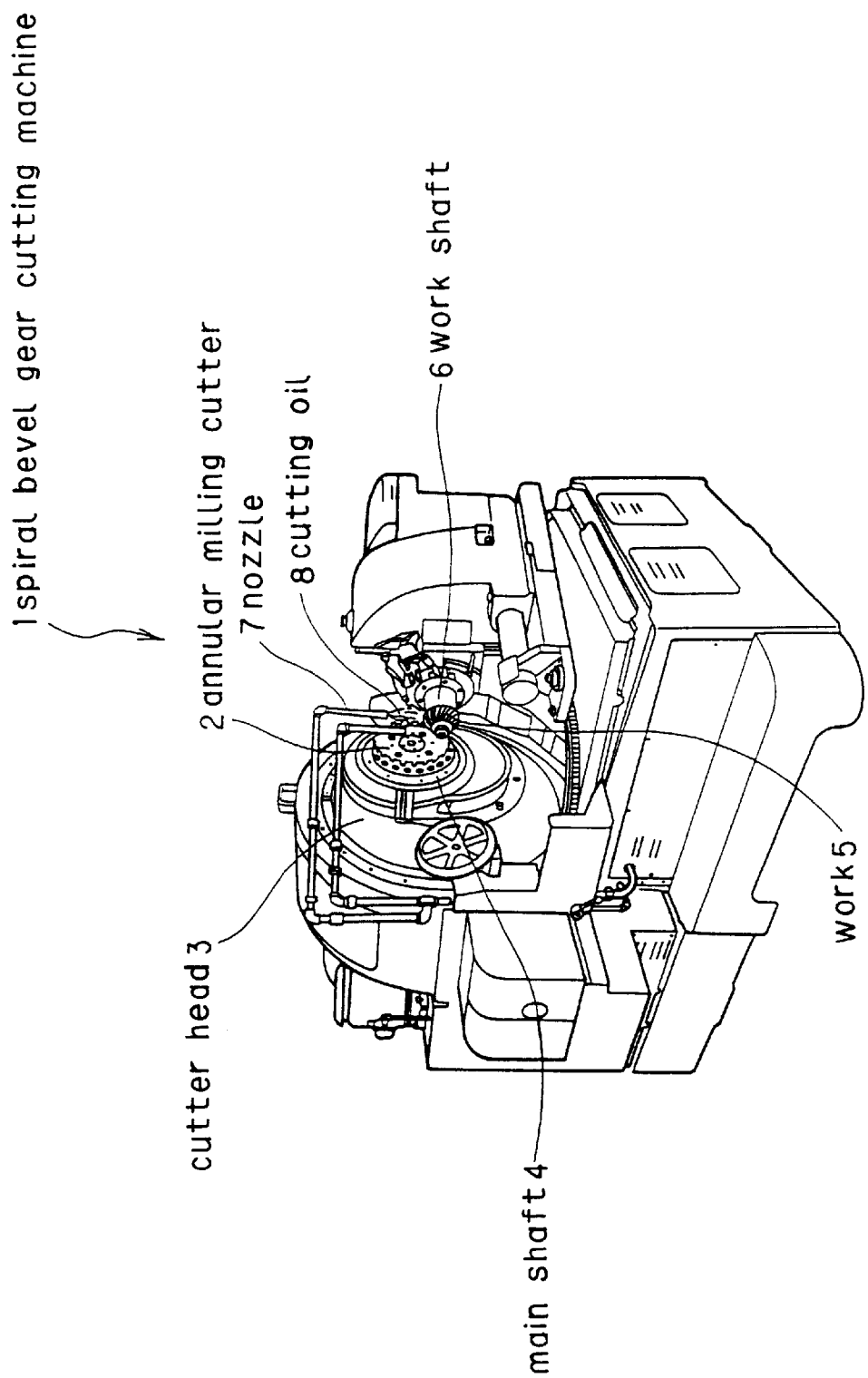
FIG. 21 is a diagram showing the entire construction of a conventional spiral bevel gear cutting machine.
Figure 22:
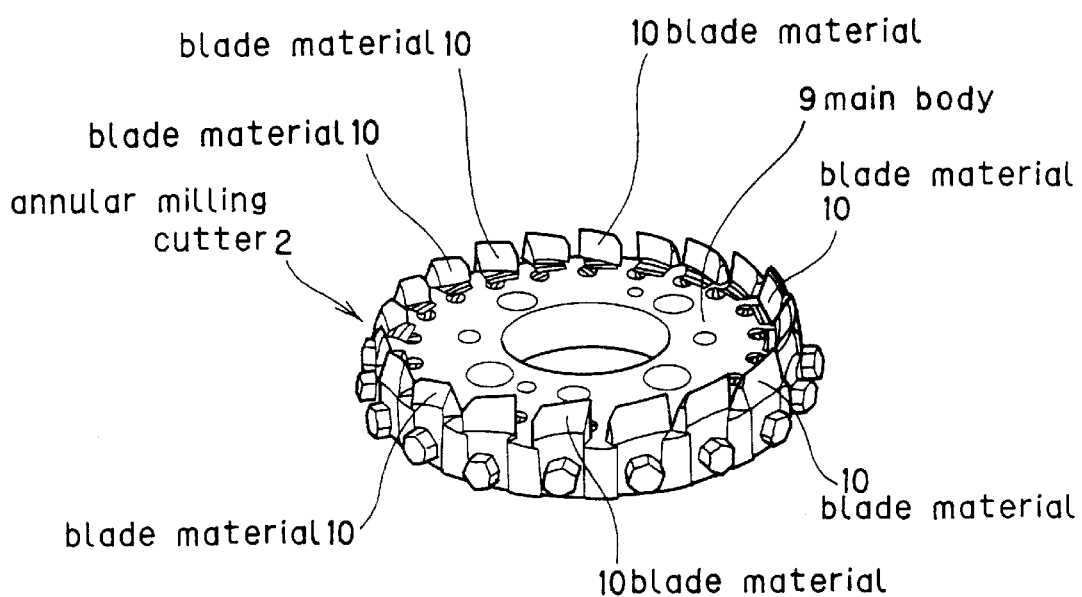
FIG. 22 is an outer appearance of an annular milling cutter.

Another embodiment of the annular milling cutter will be described with reference to FIGS. 19 and 20. FIG. 19 shows an outer appearance of the annular milling cutter according to another embodiment, and FIG. 20 is a schematic sectional diagram of the annular milling cutter.

As shown in the figures, in an annular milling cutter 61 as a spiral bevel gear cutter, a plurality of cutting rod-formed bar blade type blade materials 63 are mounted annularly on the outer periphery of a disk-formed main body 62, and the blade materials 63 are fixed to a main body 62 by a ring 71. The blade material 63 is provided with an outside blade 64 and an inside blade 65.

As the blade material 63, as is the above-described blade material 23, a blade material 63 made of a high-speed steel coated at least on a cutting edge portion with nitride of TiAl or carbonitride of TiAl is used. Even with the annular milling cutter 61 applied with the bar blade type blade 63, quite the same as with the above-described annular milling cutter 2, high efficiency low-cost dry cutting can be achieved. Further, since the blade material 63 is of a rod-formed bar blade type, polishing for forming the cutting edge can be performed in the axial direction, the top rake surface is not required to be polished, and a single blade material 63 can be repeatedly used over an extended period of time.

UTILIZABILITY IN INDUSTRY

The gear cutting method according to an aspect of the present invention is a gear cutting method for generating a bevel gear using a spiral bevel gear cutter having a blade material made of a high-speed tool steel mounted on a cutter main body and coated with at least one layer of a film of a composition substantially comprising TiAlN, teeth are generated by dry cutting without using a cutting oil at a cutting speed in a range from 20 to 400 m/min. With the present method, teeth of a bevel gear can be generated at a greatly improved cutting speed without using any expensive blade material such as a tool made of cemented carbide or the like. As a result, it is possible to perform gear cutting at a high efficiency and low cost.

The gear cutting method according to an aspect of the present invention is characterized in that teeth of a bevel gear are generated using a spiral bevel gear cutter having a blade material made of a high-speed tool steel mounted on a cutter main body, the blade material being coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$,
the cutting speed being in a range from 20 to 400 m/min, and teeth can be generated by dry cutting without using a cutting oil at a greatly improved cutting speed without using an expensive blade material such as a tool made of cemented carbide or the like. As a result, it is possible to perform gear cutting at a high efficiency and low cost.

The gear cutting method according to another aspect of the present invention is characterized in that teeth of a bevel gear are generated using a spiral bevel gear cutter having a blade material made of a high-speed tool steel mounted on a cutter main body, the blade material being coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$,
$0.45 \leq w \leq 0.55$,
the cutting speed being in a range from 20 to 400 m/min, and teeth can be generated by dry cutting without using a cutting oil at a greatly improved cutting speed without using an expensive blade material such as a tool made of cemented carbide or the like. As a result, it is possible to perform gear cutting at a high efficiency and low cost.

Further, N and C can be contained in amounts equal to or larger than Ti and Al which are metal elements, thereby solid solution reinforcement of the coating film being expectable.

The gear cutting method according to another aspect of the present invention is characterized in that the teeth of a bevel gear are generated using a spiral bevel gear cutter having a blade material made of a high-speed tool steel mounted on a cutter main body, where a nitride forming element is represented by M, the blade material being coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$.
the cutting speed being in a range from 20 to 400 m/min, and teeth can be generated by dry cutting without using a cutting oil at a greatly improved cutting speed without using an expensive blade material such as a tool made of cemented carbide or the like.

Further, N and C can be contained in amounts equal to or larger than Ti and Al which are metal elements, thereby solid solution reinforcement of the coating film being expectable. As a result, it is possible to perform gear cutting at high efficiency and low cost.

The gear cutting method according to another aspect of the present invention is characterized in that the cutting speed is in a range from 40 to 120 m/min.

The gear cutting method according to another aspect of the present invention is characterized in that teeth are generated while blowing air against the cutting portion to remove debris which prevents cutting debris from biting into the work, thereby achieving gear cutting at high efficiency and low cost.

The gear cutting method according to another aspect of the present invention is characterized in that teeth are generated while blowing air against the cutting portion in a direction along the rotational direction of the spiral bevel gear cutter to blow off cutting debris, and from the outer periphery of the spiral bevel gear cutter towards the center of the spiral bevel gear cutter to blow off cutting debris from a space between the blade materials, and cooling air is blown against the work thereby preventing cutting debris from biting into the work and achieving gear cutting at high efficiency and low cost.

The gear cutting method according to another aspect of the present invention is characterized in that the generated gear is a bevel gear used for an automotive reduction apparatus, therefore, a bevel gear for automotive reduction apparatus can be generated at high efficiency and low cost.

The gear cutting apparatus according to another aspect of the present invention is characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon and coated with at least one layer of a film of a composition substantially comprising TiAlN, teeth are generated by dry cutting without using a cutting oil at a cutting speed in a range from 20 to 400 m/min thereby generating teeth of a bevel gear at a greatly improved cutting speed without using any expensive blade material such as a tool made of cemented carbide or the like. As a result, it is possible to perform gear cutting at high efficiency and low cost.

The gear cutting apparatus according to another aspect of the present invention is characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cuter has a blade material mounted thereon and coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$,
the cutting speed being in a range from 20 to 400 m/min, and teeth are generated by dry cutting without using a cutting oil.

With the present apparatus, teeth of a bevel gear can be generated at a greatly improved cutting speed without using any expensive blade material such as a tool made of cemented carbide or the like. As a result, it is possible to perform gear cutting at high efficiency and low cost.

The gear cutting apparatus according to another aspect of the present invention is characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in cooperation with rotation of the tool main shaft and revolution of the cutter head, in which the spiral bevel gear cutter has a blade material mounted thereon and coated with at least one layer of a film of a composition substantially comprising:

$$(Ti_{(1-x)}Al_x)_{(1-w)}(N_yC_{(1-y)})_w$$

$0.2 \leq x \leq 0.85$,
$0.2 \leq y \leq 1.0$,
$0.45 \leq w \leq 0.55$, the cutting speed being in a range from 20 to 400 m/min, and teeth are generated by dry cutting without using a cutting oil.

With the apparatus according to the present invention, teeth of a bevel gear can be generated at a greatly improved cutting speed without using any expensive blade material such as a tool made of cemented carbide or the like, and N and C be contained in amounts equal to or larger than Ti and Al which are metal elements, thereby solid solution reinforcement of the coating film being expectable. As a result, it is possible to perform gear cutting at high efficiency and low cost.

The gear cutting apparatus according to another aspect of the present invention is characterized in that a tool main shaft of a cutter head supporting a spiral bevel gear cutter and a work shaft supporting a work are disposed so that rotational center axes thereof intersect with each other, the cutter head is supported to be revolvable round a mechanical center, the spiral bevel gear cutter and the work are meshed with each other by rotating the work shaft in the cooperation with rotation of the tool main shaft and revolution of the cutter head, in which the spiral bevel gear cutter has a blade material mounted thereon, where a nitride forming element is represented by M, and coated with at least one layer of a film of a composition substantially comprising:

$$(Ti_zAl_xM_{(1-z-x)})_{(1-w)}N_yC_{(1-y)})_w$$

where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$;

the cutting speed being in a range from 20 to 400 m/min, and teeth are generated by dry cutting without using a cutting oil.

With the apparatus according to the present invention, teeth of a bevel gear can be generated at a greatly improved cutting speed without using any expensive blade material such as a tool made of cemented carbide or the like, thereby achieving gear cutting at high efficiency and low cost.

Further, N and C can be contained in amounts equal to or larger than Ti and Al which are metal elements, thereby solid solution reinforcement of the coating film being expectable.

The gear cutting apparatus of the invention described in claim 13 is characterized in that the cutting speed is in a range from 40 to 120 m/min thereby achieving gear cutting at high efficiency and low cost.

The gear cutting apparatus according to another aspect of the present invention is characterized in that air supply means is provided for blowing air to blow off cutting debris against the cutting portion, and gear cutting is performed while blowing air from the air supply means, thereby preventing cutting debris from biting into the work and achieving generation of a bevel gear at high efficiency and low cost.

The gear cutting apparatus according to another aspect of the present invention is characterized in that a first air nozzle is provided for blowing air to blow off cutting debris against the cutting portion in a direction along the rotational direction of the spiral bevel cutter, and a second air nozzle is provided for blowing air to blow off cutting debris from a space between the blade materials, and a third air nozzle is provided for blowing work cooling air thereby preventing cutting debris from biting into the work and achieving generation of a bevel gear at high efficiency and low cost.

The gear cutting apparatus according to another aspect of the present invention is characterized in that the generated gear is a bevel gear used for an automotive reduction apparatus, therefore, a bevel gear for automotive reduction apparatus can be generated at high efficiency and low cost.

The spiral bevel gear cutter according to another aspect of the present invention is characterized by a blade material made of a high-speed tool steel mounted on a cutter main body and coated with at least one layer of a film of a composition substantially comprising TiAlN, teeth are generated by dry cutting without using a cutting oil at a cutting speed in a range from 20 to 400 m/min.

With the gear cutter according to the invention, teeth of a bevel gear can be generated at a greatly improved cutting speed without using any expensive blade material such as a tool made of cemented carbide or the like, thereby achieving gear cutting at high efficiency and low cost.

The spiral bevel gear cutter according another aspect of the present invention is characterized by a blade material made of a high-speed tool steel mounted on a cutter main body and coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$, the cutting speed being in a range from 20 to 400 m/min, and teeth are generated by dry cutting without using a cutting oil.

With the present invention, teeth of a bevel gear can be generated at a greatly improved cutting speed without using any expensive blade material such as a tool made of cemented carbide or the like. As a result, it is possible to perform gear cutting at high efficiency and low cost.

The spiral bevel gear cutter according to the invention described in claim 19 is characterized by a blade material made of a high-speed tool steel mounted on a cutter main body and coated with at least one layer of a film of a composition substantially comprising:

$$(Ti_{(1-x)}Al_x)_{(1-w)}(N_yC_{(1-y)})_w$$

where, $0.2 \leq x \leq 0.85$,
$0.2 \leq y \leq 1.0$
$0.45 \leq w \leq 0.55$, the cutting speed being in a range from 20 to 400 m/min, and teeth are generated by dry cutting without using a cutting oil.

With the present invention, teeth of a bevel gear can be generated at a greatly improved cutting speed without using any expensive blade material such as a tool made of cemented carbide or the like. As a result, it is possible to perform gear cutting at high efficiency and low cost.

Further, N and C can be contained in amounts equal to or larger than Ti and Al which are metal elements, thereby solid solution reinforcement of the coating film being expectable.

The spiral bevel gear cutter according to another aspect of the present invention is characterized by a blade material made of a high-speed tool steel mounted on a cutter main body, where a nitride forming element is represented by M, and coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$,
the cutting speed being in a range from 20 to 400 m/min, and teeth are generated by dry cutting without using a cutting oil.

According to the present invention, teeth of a bevel gear can be generated at a greatly improved cutting speed without using any expensive blade material such as a tool made of cemented carbide or the like. As a result, it is possible to perform gear cutting at high efficiency and low cost.

Further, N and C can be contained in amounts equal to or larger than Ti and Al which are metal elements, thereby solid solution reinforcement of the coating film being expectable.

Since in the spiral bevel gear cutter according to another aspect of the present invention, the cutting speed is in a range from 40 to 120 m/min, it is possible to perform gear cutting at high efficiency and low cost.

Since in the spiral bevel gear cutter according to another aspect of the present invention, teeth are generated while blowing air to blow off cutting debris against the cutting portion, it is possible to perform bevel gear generation at high efficiency and low cost without biting of cutting debris into the work.

Since in the spiral bevel gear cutter according to another aspect of the present invention, teeth are generated while blowing air against the cutting portion in a direction along a rotational direction of the spiral bevel gear cutter to blow off cutting debris, and from the outer periphery towards the center of the spiral bevel gear cutter to blow off cutting debris from a space between the blade materials, and cooling air is blown against the work, it is possible to perform bevel gear generation at high efficiency and low cost without biting of cutting debris into the work.

Since in the spiral bevel gear cutter according to another aspect of the present invention, the generated gear is bevel gear used for an automotive reduction apparatus, a bevel gear for automotive reduction apparatus can be generated at high efficiency and low cost.

What is claimed is:

1. A spiral bevel gear cutter comprising:
a cutter main body; and
a blade material made of a high-speed tool steel mounted on said cutter main body, where a nitride forming element is represented by M, and coated with at least one layer of a film of a composition substantially comprising:

$$(Ti_zAl_xM_{(1-z-x)})_{(1-w)}(N_yC_{(1-y)})_w$$

where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$,
wherein said spiral bevel gear cutter generates teeth by dry cutting without using a cutting oil.

2. A gear cutting method for generating a bevel gear comprising generating teeth of a bevel gear using a spiral bevel gear cutter having a blade material made of a high-speed tool steel mounted on a cutter main body, said blade material being coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$,
and teeth are generated by dry cutting at a cutting speed in a range from 20 to 400 m/min without using a cutting oil.

3. A gear cutting method for generating a bevel gear comprising generating teeth of a bevel gear using a spiral bevel gear cutter having a blade material made of a high-speed tool steel mounted on a cutter main body, said blade material being coated with at least one layer of a film of a composition substantially comprising:

$$(Ti_{(1-x)}Al_x)_{(1-w)}(N_yC_{(1-y)})_w$$

where, $0.2 \leq x \leq 0.85$,
$0.2 \leq y \leq 1.0$,
$0.45 \leq w \leq 0.55$,
and teeth of a bevel gear are generated by dry cutting at a cutting speed in a range from 20 to 400 m/min without using a cutting oil.

4. A gear cutting method for generating a bevel gear comprising generating teeth of a bevel gear using a spiral bevel gear cutter having a blade material made of a high-speed tool steel mounted on a cutter main body, where a nitride forming element is represented by M, the blade material being coated with at least one layer of a film of a composition substantially comprising:

$$(Ti_zAl_xM_{(1-z-x)})_{(1-w)}(N_yC_{(1-y)})_w$$

Where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$,
and teeth of a bevel gear are generated by dry cutting without using a cutting oil at a cutting speed in a range from 20 to 400 m/min.

5. The gear cutting method as claimed in any one of claims 2–4, wherein cutting speed is in the range from 40 to 120 m/min.

6. The gear cutting method as claimed in any one of claims 2 to 4, wherein teeth are generated while blowing air against a cutting portion to remove cutting debris.

7. The gear cutting method as claimed in any one of claims 2 to 4, wherein teeth are generated while blowing air against a cutting portion in a direction along a rotational direction of said spiral bevel gear cutter to blow off cutting debris, and from an outer periphery of said spiral bevel gear cutter towards the center of said spiral bevel gear cutter to blow off cutting debris from a space between said blade materials, and cooling air is blown against a work.

8. The gear cutting method as claimed in any one of claims 2 to 4, wherein the generated gear is a bevel gear used for an automotive reduction apparatus.

9. A spiral bevel gear cutter comprising:
a cutter main body; and
a blade material made of a high-speed tool steel mounted on said cutter main body and coated with at least one layer of a film of a composition substantially comprising:

$$(Ti_{(1-x)}Al_x)_{(1-w)}(N_yC_{(1-y)})_w$$

Where, $0.2 \leq x \leq 0.85$,
$0.2 \leq y \leq 1.0$,
$0.45 \leq w \leq 0.55$,
wherein said spiral bevel gear cutter generates teeth by dry cutting at a cutting speed in a range from 20 to 400 m/min without using a cutting oil, said cutting speed being achieved when said spiral bevel gear cutter is rotated by an apparatus connected thereto.

10. A gear cutting apparatus for generating a bevel gear comprising:
    a tool main shaft of a cutter head supporting a spiral bevel gear cutter; and
    a work shaft supporting a work, wherein said tool main shaft and said work shaft are disposed so that rotational center axes thereof intersect with each other, said cutter head is supported to be revolvable around a mechanical center, said spiral bevel gear cutter and said work are meshed with each other by rotating said work shaft in cooperation with rotation of said tool main shaft and revolution of said cutter head, in which said spiral bevel gear cutter has a blade material mounted thereon and coated with at least one layer of a film of a composition substantially comprising:

$$(Ti_{(1-x)}Al_x)(N_yC_{(1-y)})$$

where, $0.2 \leq x \leq 0.85$,
$0.2 \leq y \leq 1.0$,
and teeth of a bevel gear are generated by dry cutting at a cutting speed in a range from 20 to 400 m/min without using a cutting oil.

11. A gear cutting apparatus for generating a bevel gear comprising:
    a tool main shaft of a cutter head supporting a spiral bevel gear cutter; and
    a work shaft supporting a work, wherein said tool main shaft and said work shaft are disposed so that rotational center axes thereof intersect with each other, said cutter head is supported to be revolvable around a mechanical center, said spiral bevel gear cutter and said work are meshed with each other by rotating said work shaft in cooperation with rotation of said tool main shaft and revolution of said cutter head, in which said spiral bevel gear cutter has a blade material mounted thereon and coated with at least one layer of a film of a composition substantially comprising:

$$(Ti_{(1-x)}Al_x)_{(1-w)}(N_yC_{(1-y)})_w$$

Where, $0.2 \leq x \leq 0.85$,
$0.2 \leq y \leq 1.0$,
$0.45 \leq w \leq 0.55$,
and teeth of a bevel gear are generated by dry cutting at a cutting speed in a range from 20 to 400 m/min without using a cutting oil, said cutting speed being achieved by rotation of said tool main shaft and said work shaft by said gear cutting apparatus.

12. A gear cutting apparatus for generating a bevel gear comprising:
    a tool main shaft of a cutter head supporting a spiral bevel gear cutter; and
    a work shaft supporting a work, wherein said tool main shaft and said work shaft are disposed so that rotational center axes thereof intersect with each other, said cutter head is supported to be revolvable around a mechanical center, said spiral bevel gear cutter and said work are meshed with each other by rotating said work shaft in cooperation with rotation of said tool main shaft and revolution of said cutter head, in which said spiral bevel gear cutter has a blade material mounted thereon, where a nitride forming element is represented by M, and coated with at least one layer of a film of a composition substantially comprising:

$$(Ti_zAl_xM_{(1-z-x)})_{(1-w)}(N_yC_{(1-y)})_w$$

Where, $0.2 \leq x \leq 0.85$,
$0.2 \leq y \leq 1.0$,
$0.15 \leq z \leq 0.8$
$0.7 \leq (z+x) \leq 1.0$
$0.45 \leq w \leq 0.55$;
and teeth of a bevel gear are generated by dry cutting at a cutting speed in a range from 20 to 400 m/min without using a cutting oil, said cutting speed being achieved by rotation of said tool main shaft and said work shaft by said gear cutting apparatus.

13. A spiral bevel gear cutter comprising:
    a cutter main body; and
    a blade material made of a high-speed tool steel mounted on said cutter main body and coated with at least one layer of a film of a composition substantially comprising:

$$(Ti_{(1-x)}Al_xX)(N_yC_{(1-y)})$$

where, $0.2 \leq x \leq 0.85$,
$0.2 \leq y \leq 1.0$,
wherein said spiral bevel gear cutter generates teeth by dry cutting at a cutting speed in a range from 20 to 400 m/min without using a cutting oil.

14. The gear cutting apparatus as claimed in any one of claims 10 to 12, further comprising:
    an air supply for blowing air to blow off cutting debris against a cutting portion.

15. The gear cutting apparatus as claimed in any one of claims 10 to 12, further comprising:
    a first air nozzle for blowing air to blow off cutting debris against said cutting portion in a direction along a rotational direction of said spiral bevel cutter;
    a second air nozzle for blowing air to blow off cutting debris from a space between said blade materials; and
    a third air nozzle for blowing work cooling air.

16. The gear cutting apparatus as claimed in any one of claims 10 to 12, wherein the generated gear is a bevel gear used for an automotive reduction apparatus.

17. The spiral bevel gear cutter as claimed in any one of claims 1, 9 or 13, wherein teeth are generated while blowing air to blow off cutting debris against a cutting portion.

18. The spiral bevel gear cutter as claimed in any one of claims 1, 9 or 13, wherein said spiral bevel gear cutter generates teeth while air is blown against a cutting portion in a direction along a rotational direction of said spiral bevel gear cutter to blow off cutting debris, and from the outer periphery towards the center of said spiral bevel gear cutter to blow off cutting debris from a space between said blade materials, and cooling air is blown against the work in which teeth are being generated.

19. The spiral bevel gear cutter as claimed in any one of claims 1, 9 or 13, wherein said spiral bevel gear cutter generates a gear that is a bevel gear used for an automotive reduction apparatus.

* * * * *